US012742085B2

(12) United States Patent
Numazawa et al.

(10) Patent No.: US 12,742,085 B2
(45) Date of Patent: Sep. 22, 2026

(54) INK JET RECORDING INK AND INK JET RECORDING METHOD

(71) Applicant: FUJIFILM CORPORATION, Tokyo (JP)

(72) Inventors: Hiromichi Numazawa, Kanagawa (JP); Daisuke Sasaki, Kanagawa (JP); Yusuke Sakai, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 78 days.

(21) Appl. No.: 18/603,232

(22) Filed: Mar. 13, 2024

(65) Prior Publication Data

US 2024/0240040 A1 Jul. 18, 2024

Related U.S. Application Data

(63) Continuation of application No. PCT/JP2022/034107, filed on Sep. 12, 2022.

(30) Foreign Application Priority Data

Sep. 30, 2021 (JP) ................................ 2021-161313
Aug. 23, 2022 (JP) ................................ 2022-132501

(51) Int. Cl.

*C09D 11/328* (2014.01)
*B41M 7/00* (2006.01)
*C09D 11/037* (2014.01)
*C09D 11/101* (2014.01)
*C09D 11/107* (2014.01)
*C09D 11/322* (2014.01)

(52) U.S. Cl.

CPC ........... *C09D 11/328* (2013.01); *B41M 7/009* (2013.01); *C09D 11/037* (2013.01); *C09D 11/101* (2013.01); *C09D 11/107* (2013.01); *C09D 11/322* (2013.01)

(58) Field of Classification Search

CPC ... C09D 11/101; C09D 11/322; C09D 11/037; C09D 11/38; C09D 11/30; C09D 11/326; C09D 4/00; B41J 2/01; B41J 11/00216; B41M 5/0023; B41M 5/0047; B29C 64/112; B33Y 70/00; B33Y 10/00

See application file for complete search history.

(56) References Cited

U.S. PATENT DOCUMENTS

2006/0229412 A1 10/2006 Laksin et al.
2008/0090930 A1* 4/2008 Madhusoodhanan .. C09D 11/30 522/182
2009/0197055 A1 8/2009 Yokoi
2011/0166687 A1* 7/2011 Templeman ........... C08G 59/68 700/111
2012/0026235 A1 2/2012 Hayata
2013/0040157 A1* 2/2013 Igarashi .................. B32B 27/20 524/400
2016/0090495 A1 3/2016 Suzuki
2016/0103247 A1 4/2016 Hitomi et al.
2020/0115556 A1 4/2020 Sakamoto et al.
2020/0183272 A1* 6/2020 Miyata .................... G03F 7/027
2020/0282636 A1* 9/2020 Nishimoto ............ B29C 64/112
2020/0362186 A1 11/2020 Cortes Salazar et al.
2020/0407578 A1* 12/2020 Yamaguchi ............ C09D 11/38
2021/0023868 A1* 1/2021 Anzai ...................... B41M 5/52
2021/0395549 A1 12/2021 Hara et al.
2022/0348779 A1 11/2022 Takeshita et al.
2023/0203330 A1 6/2023 Numazawa et al.

FOREIGN PATENT DOCUMENTS

| | | | |
|---|---|---|---|
| CN | 101233208 | A | 7/2008 |
| CN | 105462360 | A | 4/2016 |
| CN | 116096576 | A | 5/2023 |
| EP | 2412764 | A1 | 2/2012 |
| EP | 3805002 | A1 | 4/2021 |
| JP | 2011-195596 | A | 10/2011 |
| JP | 2015-057330 | A | 3/2015 |
| JP | 2021-503178 | A | 2/2021 |
| TW | 201502258 | A | 1/2015 |
| WO | 2020/202628 | A1 | 10/2020 |
| WO | 2021/145062 | A1 | 7/2021 |
| WO | 2022/054387 | A1 | 3/2022 |

OTHER PUBLICATIONS

Extended European Search Report dated Jan. 8, 2025, issued in corresponding EP Patent Application No. 22875797.7.
International Search Report issued in International Application No. PCT/JP2022/034107 on Nov. 22, 2022.
Written Opinion of the ISA issued in International Application No. PCT/JP2022/034107 on Nov. 22, 2022.
English language translation of the following: Office action dated Aug. 20, 2025 from the SIPO in a Chinese patent application No. 202280065352.8 corresponding to the instant patent application. This office action translation is submitted now in order to supplement the understanding of the cited references which are being disclosed in the instant Information Disclosure Statement.
English language translation of the following: Office action dated Dec. 19, 2025 from the SIPO in a Chinese patent application No. 202280065352.8 corresponding to the instant patent application.

* cited by examiner

*Primary Examiner* — John P Zimmermann
(74) *Attorney, Agent, or Firm* — SOLARIS Intellectual Property Group, PLLC

(57) ABSTRACT

Provided are an ink jet recording ink containing a polymerizable monomer (A), a polymerization initiator (B), a siloxane compound (C) which includes a main chain including a structural unit having an Si—O bond and a side chain including at least one of an ethyleneoxy unit or a propyleneoxy unit and a polymerizable group, in which a proportion of a total number of moles of the ethyleneoxy unit and the propyleneoxy unit with respect to a total number of moles of the structural unit having an Si—O bond, the ethyleneoxy unit, and the propyleneoxy unit is 30% by mole or more, and a near-infrared absorbing coloring agent (D), and an ink jet recording method.

9 Claims, No Drawings

INK JET RECORDING INK AND INK JET RECORDING METHOD

CROSS-REFERENCE TO RELATED APPLICATIONS

This application is a continuation application of International Application No. PCT/JP2022/034107, filed Sep. 12, 2022, the disclosure of which is incorporated herein by reference in its entirety. Further, this application claims priority from Japanese Patent Application No. 2021-161313, filed Sep. 30, 2021, and Japanese Patent Application No. 2022-132501, filed Aug. 23, 2022, the disclosures of which are incorporated herein by reference in their entirety.

BACKGROUND OF THE INVENTION

1. Field of the Invention

The present disclosure relates to an ink jet recording ink and an ink jet recording method.

2. Description of the Related Art

In recent years, studies have been conducted on an ink containing a near-infrared absorbing coloring agent.

For example, WO2020/202628A discloses a photocurable ink composition which has a high infrared absorbing rate after photocuring and is capable of recording images with excellent light resistance in infrared absorbing images, the photocurable ink composition containing particles of a specific squarylium coloring agent as the near-infrared absorbing coloring agent, a radically polymerizable monomer, a radical polymerization initiator, and a coloring agent sensitizer, in which a volume average particle size of the particles of the squarylium coloring agent is 10 nm to 400 nm.

SUMMARY OF THE INVENTION

The ink containing a near-infrared absorbing coloring agent may be used for recording a near-infrared absorbing image for security applications or traceability applications. Such a near-infrared absorbing image is recorded, for example, as an image of a dot code pattern, and may be read by irradiation with infrared rays.

On the other hand, in recent years, a possibility that an alcohol such as ethanol adheres to an image in an article with a recorded image has increased. For example, in handling of the article with a recorded image, the alcohol may be used as a cleaning agent for cleaning, disinfection, or the like. In addition, in physical distribution of the article with a recorded image, the alcohol may adhere to the image.

However, in a case where the alcohol adheres to the infrared absorbing image, it may be difficult to read the infrared absorbing image.

In the circumstances described above, from the viewpoint of ensuring readability even in a case where alcohol adheres, the near-infrared absorbing image is required to have alcohol resistance in some cases.

An object of one aspect of the present disclosure is to provide an ink jet recording ink and an ink jet recording method, which are capable of recording a near-infrared absorbing image having excellent alcohol resistance.

The present disclosure includes the following aspects.

<1> An ink jet recording ink comprising:

a polymerizable monomer (A);

a polymerization initiator (B);

a siloxane compound (C) which includes a main chain including a structural unit having an Si—O bond and a side chain including at least one of an ethyleneoxy unit or a propyleneoxy unit and a polymerizable group, in which a proportion of a total number of moles of the ethyleneoxy unit and the propyleneoxy unit with respect to a total number of moles of the structural unit having an Si—O bond, the ethyleneoxy unit, and the propyleneoxy unit is 30% by mole or more; and a near-infrared absorbing coloring agent (D).

<2> The ink jet recording ink according to <1>, in which an SP value of the polymerizable monomer (A) is 18.0 $MPa^{1/2}$ or less.

<3> The ink jet recording ink according to <1> or <2>, in which a content of the siloxane compound (C) is 0.5% by mass to 3.0% by mass with respect to a total amount of the ink jet recording ink.

<4> The ink jet recording ink according to any one of <1> to <3>, in which a mass ratio of a content of the polymerizable monomer (A) to a content of the siloxane compound (C) is 26.0 to 300.

<5> The ink jet recording ink according to any one of <1> to <4>, in which a proportion of a monofunctional polymerizable monomer in the polymerizable monomer (A) is 50% by mass or less.

<6> The ink jet recording ink according to any one of <1> to <5>, in which the near-infrared absorbing coloring agent (D) includes a squarylium coloring agent represented by Formula 1.

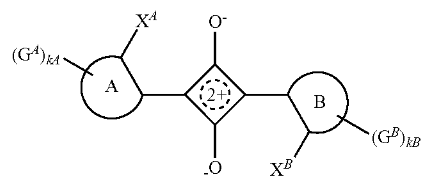

(1)

In Formula 1, a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to $n_A$, kB represents an integer of 0 to $n_B$, $n_A$ represents an integer which is a maximum number of $G^A$'s substitutable for the ring A, $n_B$ represents an integer which is a maximum number of $G^B$'s substitutable for the ring B, $X^A$ and $G^A$ may be bonded to each other to form a ring, $X^B$ and $G^B$ may be bonded to each other to form a ring, in a case of a plurality of $G^A$'s, $G^A$'s may be bonded to each other to form a ring structure, and in a case of a plurality of $G^B$'s, $G^B$'s may be bonded to each other to form a ring structure.

<7> The ink jet recording ink according to any one of <1> to <6>, in which the siloxane compound (C) includes a siloxane compound (CA) represented by Formula CA.

(CA)

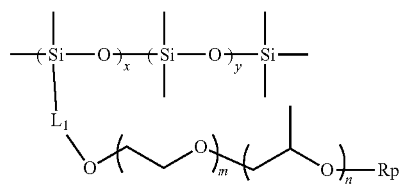

In Formula CA,

Rp represents a polymerizable group, $L_1$ represents a divalent linking group, x represents an integer of 1 or more, y represents an integer of 0 or more, m and n each independently represent an integer of 0 or more, and a sum of m and n is an integer of 1 or more, where, in Formula CA, a value A calculated by a mathematical expression "((m+n)/(x+y+m+n))×100" is 30 or more, in Formula CA, a sequence of a structural unit with a subscript x and a structural unit with a subscript y may be a sequence of block copolymerization or a sequence of random copolymerization, and in Formula CA, a sequence of a structural unit with a subscript m and a structural unit with a subscript n may be a sequence of block copolymerization or a sequence of random copolymerization.

<8> The ink jet recording ink according to any one of <1> to <7>, further comprising:

a pigment derivative.

<9> The ink jet recording ink according to any one of <1> to <8>, further comprising:

an acrylic resin.

<10> An ink jet recording method using the ink jet recording ink according to any one of <1> to <9>, the ink jet recording method comprising:

a step of jetting the ink jet recording ink onto a substrate by an ink jet recording system; and a step of irradiating the ink jet recording ink jetted onto the substrate with an active energy ray.

According to one aspect of the present disclosure, an ink jet recording ink and an ink jet recording method, which are capable of recording a near-infrared absorbing image having excellent alcohol resistance, are provided.

DESCRIPTION OF THE PREFERRED EMBODIMENTS

Hereinafter, the ink jet recording ink and ink jet recording method according to the embodiments of the present disclosure will be described in detail.

In the present specification, the numerical ranges shown using "to" means ranges including the numerical values described before and after "to" as the minimum value and the maximum value.

In a numerical range described in a stepwise manner in the present specification, an upper limit value or a lower limit value described in a certain numerical range may be replaced with an upper limit value or a lower limit value in another numerical range described in a stepwise manner. In addition, regarding the numerical range described in the present specification, an upper limit value or a lower limit value described in a numerical value may be replaced with a value described in Examples.

In the present specification, in a case where a plurality of substances corresponding to each component in a composition is present, the amount of each component in the composition means the total amount of the plurality of substances present in the composition, unless otherwise specified.

In the present specification, a combination of two or more preferred aspects is a more preferred aspect.

In the present specification, the meaning of the term "step" includes not only an independent step but also a step whose intended purpose is achieved even in a case where the step is not clearly distinguished from other steps.

In the present specification, the concept of "(meth)acrylate" includes both acrylate and methacrylate, the concept of "(meth)acryl" includes both acryl and methacryl, and the concept "(meth)acryloyl" includes both acryloyl and methacryloyl.

In the present specification, "near-infrared light" means an electromagnetic wave having a maximal absorption wavelength of 700 nm to 2500 nm.

[Ink Jet Recording Ink]

The ink jet recording ink (hereinafter, also simply referred to as "ink") according to the embodiment of the present disclosure contains a polymerizable monomer (A), a polymerization initiator (B), a siloxane compound (C) which includes a main chain including a structural unit having an Si—O bond and a side chain including at least one of an ethyleneoxy unit or a propyleneoxy unit and a polymerizable group, in which a proportion of a total number of moles of the ethyleneoxy unit and the propyleneoxy unit with respect to a total number of moles of the structural unit having an Si—O bond, the ethyleneoxy unit, and the propyleneoxy unit is 30% by mole or more, and a near-infrared absorbing coloring agent (D).

The ink according to the embodiment of the present disclosure may contain other components.

With the ink according to the embodiment of the present disclosure, it is possible to record a near-infrared absorbing image having excellent alcohol resistance.

The reason why such an effect is exhibited is presumed as follows.

As described above, with regard to a near-infrared absorbing image recorded using an ink containing a near-infrared absorbing coloring agent, from the viewpoint of ensuring readability even in a case where alcohol adheres, the near-infrared absorbing image is required to have alcohol resistance in some cases.

Regarding this point, the ink according to the embodiment of the present disclosure is an ink containing the near-infrared absorbing coloring agent (D), containing the polymerizable monomer (A) and the polymerization initiator (B), and containing the siloxane compound (C).

The siloxane compound (C) is a compound which includes a main chain including a structural unit having an Si—O bond (hereinafter, also referred to as "Si—O unit) and a side chain including at least one of an ethyleneoxy unit or a propyleneoxy unit (hereinafter, also referred to as "specific AO unit") and a polymerizable group, in which a proportion of the total number of moles of the ethyleneoxy unit and the propyleneoxy unit with respect to the total number of moles of the Si—O unit, the ethyleneoxy unit, and the propyleneoxy unit (hereinafter, also referred to as "molar ratio [specific AO unit/(Si—O unit+specific AO unit)]) is 30% by mole or more.

In the present disclosure, the structural unit having an Si—O bond means the following Si—O unit, the ethyleneoxy unit means the following EO unit, and the propyleneoxy unit means the following PO unit.

(Si-O)

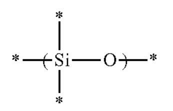

(EO)

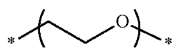

(PO)

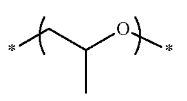

In the Si—O unit, EO unit, and PO unit, * denotes a bonding position.

In a case where the ink according to the embodiment of the present disclosure is applied onto a substrate, in the ink according to the embodiment of the present disclosure applied onto the substrate (hereinafter, also referred to as "ink film"), it is considered that the main chain of the siloxane compound (C), including the Si—O unit, is disposed near a surface of the ink film.

The Si—O unit has a property of repelling alcohol.

Furthermore, in the above-described ink film, it is considered that the side chain in the siloxane compound (C) (that is, the side chain including the specific AO unit and the polymerizable group) is disposed inside the ink film. In a case where the polymerizable group in the side chain reacts with the polymerizable monomer present inside the ink film, it is considered that the Si—O unit of the siloxane compound (C) is fixed near the surface of the ink film.

Here, in the siloxane compound (C), the molar ratio [specific AO unit/(Si—O unit+specific AO unit)] is 30% by mole or more. The molar ratio [specific AO unit/(Si—O unit+specific AO unit)] in the siloxane compound (C) corresponds to a proportion of the side chain in the entire siloxane compound (C). Since the molar ratio [specific AO unit/(Si—O unit+specific AO unit)] is 30% by mole or more, the reaction between the polymerizable monomer inside the ink film and the polymerizable group in the side chain of the siloxane compound (C) is promoted, and as a result, it is considered that the Si—O unit in the main chain of the siloxane compound (C) is firmly fixed near the surface of the ink film.

The above-described ink film is cured by a polymerization of the polymerizable monomer (A) to form a near-infrared absorbing image.

It is considered that the Si—O unit is firmly fixed even near a surface of the near-infrared absorbing image formed by curing the above-described ink film.

As a result, it is considered that alcohol resistance of the near-infrared absorbing image is stably maintained (for example, even in a case where the surface of the near-infrared absorbing image is rubbed, the alcohol resistance is stably maintained).

The near-infrared absorbing image is preferably a dot cord image.

In general, the dot code image has a larger specific surface area (that is, proportion of an air interface) than that of a solid film. Therefore, the dot code image is more susceptible to polymerization inhibition due to oxygen and is likely to have insufficient curing properties on the surface, and as a result, the alcohol resistance is likely to be degraded.

On the other hand, with the ink according to the embodiment of the present disclosure, even in a case where the near-infrared absorbing image is the dot code image, the effect of improving the alcohol resistance is effectively exhibited by the action of the siloxane compound (C).

Next, each component which can be contained in the ink according to the embodiment of the present disclosure will be described.

<Polymerizable Monomer (A)>

The ink according to the embodiment of the present disclosure contains the polymerizable monomer (A).

In the present disclosure, the polymerizable monomer (A) denotes all polymerizable monomers which can be contained in the ink.

The polymerizable monomer (A) may be only one kind of polymerizable monomer or two or more kinds of polymerizable monomers.

In the present disclosure, the monomer refers to a compound having a molecular weight of less than 1,000. The polymerizable monomer means a compound having a polymerizable group and having a molecular weight of less than 1,000.

A molecular weight of the polymerizable monomer is preferably 100 or more and less than 1,000, more preferably 100 to 800, and still more preferably 150 to 700. The molecular weight of the polymerizable monomer is calculated from the type and number of atoms constituting the polymerizable monomer.

Examples of the polymerizable monomer include a photopolymerizable monomer in which a polymerization reaction progresses due to light irradiation, and a thermopolymerizable monomer in which a polymerization reaction progresses due to heating or infrared irradiation. Examples of the photopolymerizable monomer include a polymerizable monomer having a radically polymerizable group which can be radically polymerized (that is, a radically polymerizable monomer) and a polymerizable monomer having a cationically polymerizable group which can be cationically polymerized (that is, a cationically polymerizable monomer).

Among these, as the polymerizable monomer, a photopolymerizable monomer is preferable, and a radically polymerizable monomer is more preferable.

The radically polymerizable monomer is preferably an ethylenically unsaturated monomer having an ethylenically unsaturated group as the radically polymerizable group.

Examples of the ethylenically unsaturated monomer include a monofunctional ethylenically unsaturated monomer and a polyfunctional ethylenically unsaturated monomer.

The monofunctional ethylenically unsaturated monomer is a monomer having one ethylenically unsaturated group, and examples thereof include a monofunctional (meth)acrylate, a monofunctional (meth)acrylamide, a monofunctional aromatic vinyl compound, a monofunctional vinyl ether, and a monofunctional N-vinyl compound.

Examples of the monofunctional (meth)acrylate include methyl (meth)acrylate, ethyl (meth)acrylate, propyl (meth)acrylate, n-butyl (meth)acrylate, hexyl (meth)acrylate, 2-ethylhexyl (meth)acrylate, tert-octyl (meth)acrylate, isoamyl (meth)acrylate, decyl (meth)acrylate, isodecyl (meth)

acrylate, lauryl (meth)acrylate, stearyl (meth)acrylate, isostearyl (meth)acrylate, cyclohexyl (meth)acrylate, 4-n-butylcyclohexyl (meth)acrylate, 4-tert-butylcyclohexyl (meth)acrylate, bornyl (meth)acrylate, isobornyl (meth) acrylate, 2-ethylhexyldiglycol (meth)acrylate, butoxyethyl (meth)acrylate, 2-chloroethyl (meth)acrylate, 4-bromobutyl (meth)acrylate, cyanoethyl (meth)acrylate, benzyl (meth) acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, ethyl carbitol (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, 2-phenoxymethyl (meth)acrylate, 2-phenoxyethyl (meth) acrylate, glycidyl (meth)acrylate, glycidyloxybutyl (meth) acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth) acrylate, 2-hydroxypropyl (meth)acrylate, 2-hydroxybutyl (meth)acrylate, 4-hydroxybutyl (meth)acrylate, 3-hydroxybutyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, polyethylene oxide (meth)acrylate, polyethylene oxide monoalkyl ether (meth)acrylate, dipropylene glycol (meth)acrylate, polypropylene glycol oxide monoalkyl ether (meth)acrylate, 2-methacryloyloxyethyl succinate, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth) acrylate, ethylene oxide (EO)-modified phenol (meth)acrylate, EO-modified cresol (meth)acrylate, EO-modified nonylphenol (meth)acrylate, propylene oxide (PO)-modified nonylphenol (meth)acrylate, EO-modified-2-ethylhexyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, phenoxyethylene glycol (meth)acrylate, and cyclic trimethylolpropane formal (meth)acrylate.

Examples of the monofunctional (meth)acrylamide include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth) acrylamide, N-methylol (meth)acrylamide, N,N-dimethyl (meth)acrylamide, N,N-diethyl (meth)acrylamide, and (meth)acryloylmorpholine.

Examples of the monofunctional aromatic vinyl compound include styrene, dimethylstyrene, trimethylstyrene, isopropylstyrene, chloromethylstyrene, methoxystyrene, acetoxystyrene, chlorostyrene, dichlorostyrene, bromostyrene, vinyl benzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allyl styrene, isopropenyl styrene, butenyl styrene, octenyl styrene, 4-t-butoxycarbonyl styrene, and 4-t-butoxystyrene.

Examples of the monofunctional vinyl ether include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexyl methyl vinyl ether, benzyl vinyl ether, dicyclopentenyl vinyl ether, 2-dicyclopentyloxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Examples of the monofunctional N-vinyl compound include N-vinyl-ε-caprolactam and N-vinylpyrrolidone.

From the viewpoint of improving curing properties, the monofunctional ethylenically unsaturated compound is preferably a compound having a ring structure. Examples of the monofunctional ethylenically unsaturated compound having a ring structure include monofunctional (meth)acrylates having a ring structure such as cyclohexyl (meth)acrylate, 4-n-butylcyclohexyl (meth)acrylate, 4-tert-butylcyclohexyl (meth)acrylate, bornyl (meth)acrylate, isobornyl (meth) acrylate, benzyl (meth)acrylate, 4-butylphenyl (meth)acrylate, phenyl (meth)acrylate, 2,4,5-tetramethylphenyl (meth) acrylate, 4-chlorophenyl (meth)acrylate, 2-phenoxymethyl (meth)acrylate, 2-phenoxyethyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, phenoxyethylene glycol (meth) acrylate, and cyclic trimethylolpropane formal (meth) acrylate;

- monofunctional aromatic vinyl compounds;
- monofunctional vinyl ethers having a ring structure such as cyclohexyl vinyl ether, cyclohexyl methyl vinyl ether, 4-methylcyclohexyl methyl vinyl ether, benzyl vinyl ether, dicyclopentenyl vinyl ether, 2-dicyclopentenoxyethyl vinyl ether, phenylethyl vinyl ether, and phenoxypolyethylene glycol vinyl ether; and
- monofunctional N-vinyl compounds having a ring structure such as N-vinyl-ε-caprolactam and N-vinylpyrrolidone.

Among these, from the viewpoint of rub resistance or solvent resistance of the image, the monofunctional ethylenically unsaturated compound preferably has a high glass transition temperature (Tg). Examples of the monofunctional ethylenically unsaturated compound having a ring structure and having high Tg include isobornyl (meth) acrylate (Tg: 97° C.).

The polyfunctional ethylenically unsaturated monomer is a monomer having two or more ethylenically unsaturated groups, and examples thereof include a polyfunctional (meth)acrylate and a polyfunctional vinyl ether.

Examples of the polyfunctional (meth)acrylate include ethylene glycol di(meth)acrylate, diethylene glycol di(meth) acrylate, triethylene glycol di(meth)acrylate, propylene glycol di(meth)acrylate, dipropylene glycol di(meth)acrylate, tripropylene glycol di(meth)acrylate, polyethylene glycol di(meth)acrylate, polypropylene glycol di(meth)acrylate, butylene glycol di(meth)acrylate, tetraethylene glycol di(meth)acrylate, neopentyl glycol di(meth)acrylate, 3-methyl-1,5-pentanediol di(meth)acrylate, hexanediol di(meth)acrylate, heptanediol di(meth)acrylate, EO-modified neopentyl glycol di(meth)acrylate, PO-modified neopentyl glycol di(meth)acrylate, EO-modified hexanediol di(meth)acrylate, PO-modified hexanediol di(meth)acrylate, octanediol di(meth)acrylate, nonanediol di(meth)acrylate, decanediol di(meth)acrylate, dodecanediol di(meth)acrylate, 1,6-hexanediol di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, tricyclodecanedimethanol di(meth)acrylate, trimethylolethane tri(meth)acrylate, trimethylolpropane tri(meth)acrylate, trimethylolpropane EO-added tri(meth) acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, tri(meth)acryloyloxyethoxytrimethylolpropane, glycerin polyglycidyl ether poly(meth)acrylate, tris(2-acryloyloxyethyl) isocyanurate, and 2-(2-vinyloxyethoxy) ethyl (meth)acrylate.

Examples of the polyfunctional vinyl ether include 1,4-butanediol divinyl ether, ethylene glycol divinyl ether, diethylene glycol divinyl ether, triethylene glycol divinyl ether, polyethylene glycol divinyl ether, propylene glycol divinyl ether, butylene glycol divinyl ether, hexanediol divinyl ether, 1,4-cyclohexanedimethanol divinyl ether, bisphenol A alkylene oxide divinyl ether, bisphenol F alkylene oxide divinyl ether, trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, EO-added trimethylolpropane trivinyl ether, PO-added trimethylolpropane trivinyl ether, EO-added ditrimethylolpropane tetravinyl ether, PO-added ditrimethylolpropane tetravinyl ether, EO-added pentaerythritol tetravinyl ether, PO-added pentaerythritol tetravinyl ether, EO-added dipentaerythritol hexavinyl ether, and PO-added dipentaerythritol hexavinyl ether.

From the viewpoint of improving curing properties, the polyfunctional ethylenically unsaturated monomer is preferably a compound having an oxygen atom, and a ratio of the number of oxygen atoms to the number of carbon atoms contained in one molecule is preferably 0.2 or more and more preferably 0.3 or more. The upper limit value of the ratio is not particularly limited, but is, for example, 0.5. Examples of the compound in which the ratio of the number of oxygen atoms to the number of carbon atoms contained in one molecule is 0.2 or more include polyethylene glycol diacrylate.

In addition, the polymerizable monomer may be commercially available products described in "Cross-linking Agent Handbook" (1981, edited by Shinzo Yamashita, published by Taiseisha, Ltd.), "UV-EB Curing Handbook (part of raw materials)" (1985, edited by Kiyoshi Kato, published by Kobunshi Kankokai), "Application and Market of UV-EB Curing Technology" (pp. 79, 1989, edited by Rad Tech Japan, CMC Publishing Co., Ltd.), "Polyester Resin Handbook" (1988, written by Eiichiro Takiyama, published by Nikkan Kogyo Shimbun, Ltd.), and the like.

As the polymerizable monomer (A), the ink according to the embodiment of the present disclosure preferably contains a polyfunctional polymerizable monomer, and more preferably contains a monofunctional polymerizable monomer and a polyfunctional polymerizable monomer. By containing the polyfunctional polymerizable monomer in the ink, it is possible to record an image having excellent curing properties. In addition, by containing the polyfunctional polymerizable monomer in the ink, it is possible to suppress a phenomenon (so-called migration) in which unreacted polymerizable monomers are transferred to the outside from the article with a recorded image. Particularly, the above-described ink is excellent because the ink is applicable to packaging materials in the field of food packaging and cosmetic packaging, in which the safety of substrates is strictly required.

From the viewpoint of curing properties, a proportion of the polyfunctional polymerizable monomer in the polymerizable monomer (A) contained in the ink is preferably 50% by mass or more and more preferably 60% by mass or more.

In addition, the upper limit value of the proportion of the polyfunctional polymerizable monomer in the polymerizable monomer contained in the ink is not particularly limited, and may be 100% by mass.

From the viewpoint of improving the alcohol resistance of the near-infrared absorbing image, a proportion of the monofunctional polymerizable monomer in the polymerizable monomer (A) contained in the ink is preferably 50% by mass or less and more preferably 40% by mass or less.

In addition, the proportion of the monofunctional polymerizable monomer in the polymerizable monomer contained in the ink may be 0% by mass.

A proportion of the polymerizable monomer (A) in the total amount of the ink according to the embodiment of the present disclosure is preferably 50% by mass or more, more preferably 60% by mass or more, and still more preferably 70% by mass or more.

The upper limit of the polymerizable monomer (A) in the total amount of the ink according to the embodiment of the present disclosure depends on amounts of other components, but is, for example, 95% by mass, 90% by mass, or the like.

In addition, from the viewpoint of improving the alcohol resistance of the near-infrared absorbing image, a mass ratio of the content of the polymerizable monomer (A) to a content of the siloxane compound (C), which will be described later, (hereinafter, a mass ratio [polymerizable monomer (A)/siloxane compound (C)]) in the ink according to the embodiment of the present disclosure is preferably 26.0 to 300, more preferably 26.0 to 200, and still more preferably 27.0 to 200.

In the present disclosure, from the viewpoint of improving readability after a rub test and improving solvent resistance, a glass transition temperature (Tg) of the polymerizable monomer (A) is preferably 30° C. or higher and more preferably 60° C. or higher. In particular, a proportion of a polymerizable monomer having a glass transition temperature of 30° C. or higher in the polymerizable monomer (A) is preferably 90% by mass or more and more preferably 92% by mass or more. The upper limit value of the above-described proportion is not particularly limited, but is, for example, 100% by mass. In a case where the proportion of the polymerizable monomer having a glass transition temperature of 30° C. or higher in the polymerizable monomer (A) is 90% by mass or more, the readability after a rub test is further improved. Examples of the polymerizable monomer having a Tg of 30° C. or higher include isobornyl (meth)acrylate (Tg: 97° C.).

The glass transition temperature (Tg) of the polymerizable monomer (A) means a glass transition temperature obtained in a case where the polymerizable monomer (A) is a homopolymer. By adding any polymerization initiator to the polymerizable monomer (A), a homopolymer having a weight-average molecular weight of 10,000 to 20,000 is obtained. A glass transition temperature (Tg) of the homopolymer having a weight-average molecular weight of 10,000 to 20,000 is adopted as the glass transition temperature of the polymerizable monomer (A). Although the glass transition temperature (Tg) of the homopolymer varies with the weight-average molecular weight thereof, a change in Tg caused by the variation in weight-average molecular weight in a range of 10,000 to 20,000 is negligible. The weight-average molecular weight means a value measured by gel permeation chromatography (GPC). For the measurement by GPC, HLC (registered trademark)-8020GPC (manufactured by TOSOH CORPORATION) is used as a measuring device, three TSKgel (registered trademark) Super Multipore HZ-H (4.6 mm ID×15 cm, manufactured by TOSOH CORPORATION) columns are used as columns, and tetrahydrofuran (THF) is used as an eluent. In addition, the measurement is performed under measurement conditions of a sample concentration of 0.45% by mass, a flow rate of 0.35 ml/min, a sample injection volume of 10 μl, and a measurement temperature of 40° C. using an RI detector. A calibration curve is created using 8 samples of "F-40", "F-20", "F-4", "F-1", "A-5000", "A-2500", "A-1000", and "n-propylbenzene" which are "Standard Samples TSK standard, polystyrene" (manufactured by TOSOH Corporation).

The glass transition temperature (Tg) is measured using a differential scanning calorimeter (DSC) based on ASTMD3418-8. For example, the glass transition temperature (Tg) is measured under general measurement conditions with a differential scanning calorimeter (trade name "EXSTAR6220") manufactured by SII NanoTechnology Inc.

From the viewpoint of improving the alcohol resistance of the near-infrared absorbing image, an SP value of the polymerizable monomer (A) is preferably 23.0 $MPa^{1/2}$ or less, more preferably 20.0 $MPa^{1/2}$ or less, still more preferably 18.0 $MPa^{1/2}$ or less, and even more preferably 17.6 $MPa^{1/2}$ or less.

In the present disclosure, the SP value of the polymerizable monomer (A) means Hansen solubility parameters. The Hansen solubility parameters are obtained by dividing the solubility parameters introduced by Hildebrand into three components, a dispersion element δd, a polarity element δp, and a hydrogen bond element δh, and expressing the parameters in a three-dimensional space.

An SP value 6 of the polymerizable monomer (A) is a value calculated using the following expression S.

$$SP\text{ value }(\delta)\ [MPa^{1/2}]=(\delta d^2+\delta p^2+\delta h^2)^{1/2} \quad (S)$$

The dispersion element δd, the polarity element δp, and the hydrogen bond element δh are calculated using HSPiP (version 4.1.07) software.

The following shows the dispersion element δd, the polarity element δp, the hydrogen bond element δh, and the SP value of 3-methyl-1,5-pentanediol diacrylate (MPDDA), dipropylene glycol diacrylate (DPGDA), isobornyl acrylate (IBOA), tricyclodecanedimethanol diacrylate (TCDDMDA), trimethylolpropane triacrylate (TMTPA), acryloylmorpholine (ACMO), EO-added trimethylolpropane triacrylate (EOTMPTA), and phenoxyethyl acrylate (PEA).

| | Dispersion element δd [$MPa^{1/2}$] | Polarity element δp [$MPa^{1/2}$] | Hydrogen bond element δh [$MPa^{1/2}$] | SP value [$MPa^{1/2}$] |
|---|---|---|---|---|
| MPDDA | 16.4 | 3.7 | 5.2 | 17.60 |
| DPGDA | 16.4 | 3.9 | 5.5 | 17.73 |
| IBOA | 16.7 | 2.5 | 2.7 | 17.10 |
| TCDDMDA | 17.2 | 3 | 3.7 | 17.85 |
| TMPTA | 16.4 | 2.6 | 5.3 | 17.43 |
| ACMO | 18.5 | 11.2 | 5.8 | 22.39 |
| EOTMPTA | 16.2 | 2.6 | 6.7 | 17.72 |
| PEA | 17.8 | 5 | 6 | 19.44 |

In a case where the ink contains two or more kinds of the polymerizable monomers (A), the SP value of the polymerizable monomers (A) is calculated by the following method. First, as δd, δp, and δh, weighted averages of the dispersion element, polarity element, and hydrogen bond element of the polymerizable monomers (A) contained in the ink are calculated. Based on the calculated δd, δp, and δh, the SP value is calculated using the above expression S.

In a case where the ink contains two or more kinds of the polymerizable monomers (A), δd is calculated using the following expression F1. In the expression F1, $\delta d_m$ represents a dispersion element of an m-th polymerizable monomer (A) (m represents an integer of 1 or more) in the polymerizable monomers, and $W_m$ represents a ratio of a content proportion (% by mass) of the m-th polymerizable monomer (A) to the total amount of the ink.

$$\delta d=\sum \delta d_m W_m / \sum W_m \quad (F1)$$

Similarly, in a case where the ink contains two or more kinds of the polymerizable monomers (A), δp and δh are calculated using the following expression F2 and expression F3.

$$\delta p=\sum \delta p_m W_m / \sum W_m \quad (F2)$$

$$\delta h=\sum \delta h_m W_m / \sum W_m \quad (F3)$$

In the expression F2, $\delta p_m$ represents a polarity element of the m-th polymerizable monomer (m represents an integer of 1 or more) in the polymerizable monomers (A).

In the expression F3, $\delta h_m$ represents a hydrogen bond element of the m-th polymerizable monomer (m represents an integer of 1 or more) in the polymerizable monomers (A).

<Polymerization Initiator (B)>

The ink according to the embodiment of the present disclosure contains the polymerization initiator (B).

In the present disclosure, the polymerization initiator (B) denotes all polymerization initiators which can be contained in the ink.

The polymerization initiator (B) may be only one kind of compound or two or more kinds of compounds.

In a case where the polymerizable monomer (A) in the ink according to the embodiment of the present disclosure includes the radically polymerizable monomer, the polymerization initiator (B) preferably includes a radical polymerization initiator.

Examples of the radical polymerization initiator include an alkylphenone compound, an acylphosphine compound, an aromatic onium salt compound, an organic peroxide, a thio compound, a hexaarylbiimidazole compound, a ketoxime ester compound, a borate compound, an azinium compound, a metallocene compound, an active ester compound, a carbon halogen bond-containing compound, and an alkylamine compound.

Among these, as the polymerization initiator, at least one compound selected from the group consisting of an acylphosphine compound and a thio compound is preferable, and at least one compound selected from the group consisting of an acylphosphine oxide compound and a thioxanthone compound is preferable. It is still more preferable to include an acylphosphine oxide compound and a thioxanthone compound.

In a case where the polymerization initiator includes an acylphosphine oxide compound and a thioxanthone compound, readability after a transfer test and readability after a rub test are improved.

Examples of the acylphosphine oxide compound include a monoacylphosphine oxide compound and a bisacylphosphine oxide compound, and a bisacylphosphine oxide compound is preferable.

Examples of the monoacylphosphine oxide compound include isobutyryl diphenylphosphine oxide, 2-ethylhexanoyldiphenylphosphine oxide, 2,4,6-trimethylbenzoyldiphenylphosphine oxide, (2,4,6-trimethylbenzoyl)ethoxyphenylphosphine oxide, o-toluyldiphenylphosphine oxide, p-t-butylbenzoyldiphenylphosphine oxide, 3-pyridylcarbonyldiphenylphosphine oxide, acryloyl diphenylphosphine oxide, benzoyl diphenylphosphine oxide, pivaloyl phenylphosphinic acid vinyl ester, adipoyl bisdiphenylphosphine oxide, pivaloyl diphenylphosphine oxide, p-toluyldiphenylphosphine oxide, 4-(t-butyl) benzoyldiphenylphosphine oxide, terephthaloyl bisdiphenylphosphine oxide, 2-methylbenzoyldiphenylphosphine oxide, versatoyl diphenylphosphine oxide, 2-methyl-2-ethylhexanoyldiphenylphosphine oxide, 1-methyl-cyclohexanoyldiphenylphosphine oxide, pivaloyl phenylphosphinic acid methyl ester, and pivaloyl phenylphosphinic acid isopropyl ester.

Examples of the bisacylphosphine oxide compound include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

Among these, as the acylphosphine oxide compound, bis(2,4,6-trimethylbenzoyl)phenylphosphine oxide (trade name "Omnirad 819", manufactured by IGM Resins B.V.), 2,4,6-trimethylbenzoyldiphenylphosphine oxide (trade name "Omnirad TPO H", manufactured by IGM Resins B.V.), or (2,4,6-trimethylbenzoyl)ethoxyphenylphosphine oxide (trade name "Omnirad TPO-L", manufactured by IGM Resins B.V.) is preferable.

Examples of the thioxanthone compound include thioxanthone, 2-isopropylthioxanthone, 4-isopropylthioxanthone, 2-chlorothioxanthone, 2,4-dichlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl) thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfylthioxanthone, 3,4-di[2-(2-methoxyethoxy)ethoxycarbonyl] thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboxyimide, n-octylthioxanthone-3,4-dicarboxyimide, N-(1,1,3,3-tetramethylbutyl)thioxanthone-3,4-dicarboxyimide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthone-2-yloxy)-N,N,N-trimethyl-1-propanaminium chloride.

The thioxanthone compound may be a commercially available product. Examples of the commercially available product thereof include SPEEDCURE series (for example, SPEEDCURE 7010, SPEEDCURE 7010L, SPEEDCURE CPTX, SPEEDCURE ITX, and the like) manufactured by Lambson.

In a case where the polymerization initiator (B) includes an acylphosphine oxide compound and a thioxanthone compound, a ratio of a content of the acylphosphine oxide compound to a content of the thioxanthone compound is preferably 2 to 10 and more preferably 3 to 7, based on mass.

From the viewpoint of improving the alcohol resistance of the near-infrared absorbing image, a content of the polymerization initiator (B) is preferably 5% by mass or more and more preferably 10% by mass or more with respect to the total amount of the ink. The upper limit value of the content of the polymerization initiator is not particularly limited, but is, for example, 30% by mass.

In a case where the polymerization initiator (B) includes an acylphosphine oxide compound, from the viewpoint of improving the alcohol resistance of the near-infrared absorbing image, a content of the acylphosphine oxide compound is preferably 5% by mass to 15% by mass and more preferably 8% by mass to 12% by mass with respect to the total amount of the ink.

In a case where the polymerization initiator (B) includes a thioxanthone compound, from the viewpoint of improving the alcohol resistance of the near-infrared absorbing image, a content of the thioxanthone compound is preferably 0.5% by mass to 5% by mass and more preferably 1% by mass to 3% by mass with respect to the total amount of the ink.

<Siloxane Compound (C)>

The ink according to the embodiment of the present disclosure contains the siloxane compound (C).

As described above, the siloxane compound (C) is a compound includes a main chain having the Si—O unit and a side chain including the specific AO unit (that is, at least one of the EO unit or the PO unit) and a polymerizable group, in which the molar ratio [specific AO unit/(Si—O unit+specific AO unit)] (that is, the proportion of the total number of moles of the specific AO unit with respect to the total number of moles of the Si—O unit and the specific AO unit) is 30% by mole or more.

The siloxane compound (C) contained in the ink according to the embodiment of the present disclosure may be used alone or in combination of two or more kinds thereof.

As described above, since the molar ratio [specific AO unit/(Si—O unit+specific AO unit)] in the siloxane compound (C) is 30% by mole or more, the alcohol resistance of the near-infrared absorbing image is improved.

From the viewpoint of improving the alcohol resistance of the near-infrared absorbing image to be obtained, the molar ratio [specific AO unit/(Si—O unit+specific AO unit)] in the siloxane compound (C) is preferably 50% by mole or more, more preferably 51% by mole or more, still more preferably 60% by mole or more, and even more preferably 70% by mole or more.

From the viewpoint of improving the alcohol resistance of the near-infrared absorbing image to be obtained, the upper limit of the molar ratio [specific AO unit/(Si-G unit+specific AO unit)] in the siloxane compound (C) is preferably 95% by mole and more preferably 90% by mole.

A content of the Si—O unit and the specific AO unit in the siloxane compound (C) is preferably 50% by mass or more, more preferably 60% by mass or more, and still more preferably 80% by mass or more with respect to the total amount of the siloxane compound (C).

A molecular weight of the siloxane compound (C) is preferably 1,000 or more.

The molecular weight of the siloxane compound (C) is more preferably 1,000 to 100,000, still more preferably 1,000 to 50,000, and even more preferably 1,000 to 30,000.

The main chain in the siloxane compound (C) includes the Si—O unit.

A proportion of the Si—O unit in the main chain of the siloxane compound (C) is preferably 50% by mass or more, more preferably 60% by mass or more, and still more preferably 80% by mass or more.

A terminal of the main chain in the siloxane compound (C) is preferably a trimethylsilyl group ($—Si(CH_3)_3$ group).

As the main chain in the siloxane compound (C), a main chain represented by Formula CA1 is preferable.

(CA1)

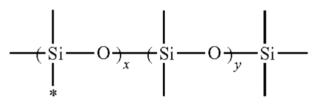

In Formula CA1, x represents an integer of 1 or more, y represents an integer of 0 or more, and

* represents a bonding position to a side chain, where, in Formula CA1, a sequence of a structural unit with a subscript x (that is, an Si—O unit bonded to the side chain) and a structural unit with a subscript y (that is, an Si—O unit not bonded to the side chain) may be a sequence of block copolymerization or a sequence of random copolymerization.

The side chain in the siloxane compound (C) includes the specific AO unit (that is, at least one of an ethyleneoxy unit or a propyleneoxy unit) and a polymerizable group.

As the polymerizable group, a radically polymerizable group is preferable, an ethylenically unsaturated group is more preferable, and a (meth)acryloyl group is still more preferable.

As the side chain in the siloxane compound (C), a side chain represented by Formula CA2 is preferable.

(CA2)

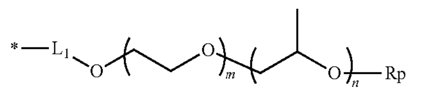

In Formula CA2,

Rp represents a polymerizable group, $L_1$ represents a divalent linking group,

* represents a bonding position to a main chain, m and n each independently represent an integer of 0 or more, and a sum of m and n is an integer of 1 or more, where, in Formula CA2, a sequence of a structural unit with a subscript m (that is, an EO unit) and a structural unit with a subscript n (that is, a PO unit) may be a sequence of block copolymerization or a sequence of random copolymerization.

As Rp, a radically polymerizable group is preferable, an ethylenically unsaturated group is more preferable, and a (meth)acryloyl group is still more preferable.

As the divalent linking group represented by $L_1$, a single bond or an alkylene group having 1 to 10 carbon atoms is preferable, an alkylene group having 1 to 10 carbon atoms is more preferable, an alkylene group having 1 to 6 carbon atoms is still more preferable, and an alkylene group having 2 to 4 carbon atoms is even more preferable.

In Formula CA2, a sequence of a structural unit with a subscript m (that is, an ethyleneoxy unit) and a structural unit with a subscript n (that is, a propyleneoxy unit) may be a sequence of block copolymerization or a sequence of random copolymerization.

That is, to the polymerizable group represented by Rp, the structural unit with the subscript m (that is, the ethyleneoxy unit) may be bonded, or the structural unit with the subscript n (that is, the propyleneoxy unit) may be bonded.

The siloxane compound (C) preferably includes a siloxane compound (CA) represented by Formula CA.

(CA)

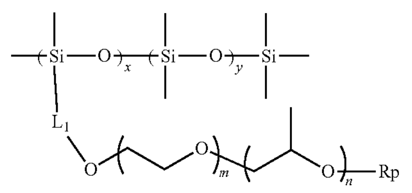

In Formula CA,

Rp represents a polymerizable group, $L_1$ represents a divalent linking group, x represents an integer of 1 or more, y represents an integer of 0 or more, m and n each independently represent an integer of 0 or more, and a sum of m and n is an integer of 1 or more, where, in Formula CA, a value A calculated by a mathematical expression "((m+n)/(x+y+m+n))×100" is 30 or more, in Formula CA, a sequence of a structural unit with a subscript x and a structural unit with a subscript y may be a sequence of block copolymerization or a sequence of random copolymerization, and in Formula CA, a sequence of a structural unit with a subscript m and a structural unit with a subscript n may be a sequence of block copolymerization or a sequence of random copolymerization.

In Formula CA, as Rp, a radically polymerizable group is preferable, an ethylenically unsaturated group is more preferable, and a (meth)acryloyl group is still more preferable.

In Formula CA, as the divalent linking group represented by $L_1$, a single bond or an alkylene group having 1 to 10 carbon atoms is preferable, an alkylene group having 1 to 10 carbon atoms is more preferable, an alkylene group having 1 to 6 carbon atoms is still more preferable, and an alkylene group having 2 to 4 carbon atoms is even more preferable.

In Formula CA, a value A calculated by a mathematical expression "((m+n)/(x+y+m+n))×100" is 30 or more.

The value A corresponds to the molar ratio [specific AO unit/(Si—O unit+specific AO unit)] described above.

In a case where the value A is 30 or more, the alcohol resistance of the near-infrared absorbing image to be obtained is further improved.

From the viewpoint of further improving the alcohol resistance of the near-infrared absorbing image to be obtained, the value A is preferably 50 or more, more preferably 51 or more, and still more preferably 70 or more.

The upper limit of the value A is preferably 95 and more preferably 90.

The siloxane compound (C) may be a commercially available product.

Examples of the commercially available product thereof include:

BYKUV-3500 (BYK Chemie Japan); and

TEGORAD 2010, 2011, 2100, 2200N, 2250, and 2300 (Evonik Industries AG).

All of these commercially available products compound to the siloxane compound (CA) represented by Formula CA.

A content of the siloxane compound (C) in the ink according to the embodiment of the present disclosure is preferably 0.1% by mass to 5.0% by mass, more preferably 0.3% by mass to 3.0% by mass, and still more preferably 0.5% by mass to 1.5% by mass with respect to the total amount of the ink.

In a case where the content of the siloxane compound (C) is 0.05% by mass or more, the alcohol resistance of the near-infrared absorbing image is further improved.

In a case where the content of the siloxane compound (C) is 5% by mass or less, foaming during jetting of the ink is further suppressed, and jettability of the ink is further improved.

<Near-Infrared Absorbing Coloring Agent (D)>

The ink according to the embodiment of the present disclosure contains the near-infrared absorbing coloring agent (D).

In the present disclosure, the near-infrared absorbing coloring agent (D) denotes all near-infrared absorbing coloring agents which can be contained in the ink.

The near-infrared absorbing coloring agent (D) may be only one kind of compound or two or more kinds of compounds.

The near-infrared absorbing coloring agent (D) preferably includes at least one selected from the group consisting of a squarylium coloring agent, a cyanine coloring agent, a phthalocyanine coloring agent, a perylene coloring agent, a pyrrolopyrrole coloring agent, an anthraquinone coloring agent, and a diimmonium coloring agent.

As the squarylium coloring agent, for example, a squarylium coloring agent represented by Formula 1, which will be described later, can be used.

As the cyanine coloring agent, a cyanine 1 shown in Examples described later can be used.

In addition, as the cyanine coloring agent, for example, compounds described in known publications such as JP2021-91809A and WO2016/186050A can also be used.

As the phthalocyanine coloring agent, for example, commercially available products such as EXCOLOR IR-14 manufactured by Nippon Shokubai Co., Ltd. can be used.

In addition, as the phthalocyanine coloring agent, for example, compounds described in known publications such as JP2013-151675A (paragraph 0050) can also be used.

As the perylene coloring agent, for example, commercially available products such as Lumogen IR788 from BASF SE and Lumogen IR765 from BASF SE can be used.

As the pyrrolopyrrole coloring agent, for example, a compound (A-1) shown in Examples described later can be used.

In addition, as the pyrrolopyrrole coloring agent, for example, compounds described in known publications such as WO2016/035695A, JP2009-263614A, and WO2017/130825A can be used.

The near-infrared absorbing coloring agent (D) still more preferably includes the squarylium coloring agent, and even more preferably includes a squarylium coloring agent represented by Formula 1.

(1)

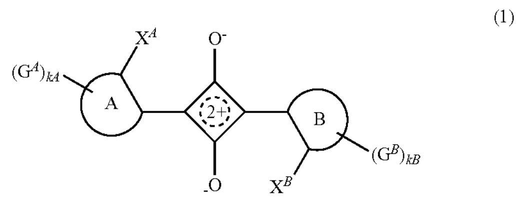

In Formula 1, a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to $n_A$, kB represents an integer of 0 to $n_B$, $n_A$ represents an integer which is a maximum number of $G^A$'s substitutable for the ring A, $n_B$ represents an integer which is a maximum number of $G^B$'s substitutable for the ring B, $X^A$ and $G^A$ may be bonded to each other to form a ring, $X^B$ and $G^B$ may be bonded to each other to form a ring, in a case of a plurality of $G^A$'s, $G^A$'s may be bonded to each other to form a ring structure, and in a case of a plurality of $G^B$'s, $G^B$'s may be bonded to each other to form a ring structure.

($G^A$ and $G^B$)

In Formula 1, $G^A$ and $G^B$ each independently represent a monovalent substituent.

Examples of the monovalent substituent represented by $G^A$ or $G^B$ include a halogen atom, a cyano group, a nitro group, an alkyl group, an alkenyl group, an alkynyl group, an aryl group, a heteroaryl group, an aralkyl group, $—OR^{10}$, $—COR^{11}$, $—COOR^{12}$, $—OCOR^{13}$, $—NR^{14}R^{15}$, $—NHCOR^{16}$, $—CONR^{17}R^{18}$, $—NHCONR^{19}R^{20}$, $—NHCOOR^{21}$, $—SR^{22}$, $—SO_2R^{23}$, $—SO_2OR^{24}$, $—NHSO_2R^{25}$, and $SO_2NR^{26}R^{27}$.

$R^{10}$ to $R^{27}$ each independently represent a hydrogen atom, an aliphatic group, an aromatic group, or a heterocyclic group.

In a case where $R^{12}$ in $—COOR^{12}$ is a hydrogen atom (that is, a carboxy group), the hydrogen atom may be dissociated (that is, a carbonate group) or may be in a state of salt.

In addition, in a case where $R^{24}$ in $—SO_2OR^{24}$ is a hydrogen atom (that is, a sulfo group), the hydrogen atom may be dissociated (that is, a sulfonate group) or may be in a state of salt.

Examples of the halogen atom include a fluorine atom, a chlorine atom, a bromine atom, and an iodine atom.

The number of carbon atoms in the alkyl group is preferably 1 to 20, more preferably 1 to 15, and still more preferably 1 to 8. The alkyl group may be linear, branched, or cyclic, and is preferably linear or branched.

The number of carbon atoms in the alkenyl group is preferably 2 to 20, more preferably 2 to 12, and particularly preferably 2 to 8. The alkenyl group may be linear, branched, or cyclic, and is preferably linear or branched.

The number of carbon atoms in the alkynyl group is preferably 2 to 40, more preferably 2 to 30, and particularly preferably 2 to 25. The alkynyl group may be linear, branched, or cyclic, and is preferably linear or branched.

The number of carbon atoms in the aryl group is preferably 6 to 30, more preferably 6 to 20, and still more preferably 6 to 12.

An alkyl portion in the aralkyl group is the same as the above-described alkyl group. An aryl portion in the aralkyl group is the same as the above-described aryl group. The number of carbon atoms in the aralkyl group is preferably 7 to 40, more preferably 7 to 30, and still more preferably 7 to 25.

The heteroaryl group is preferably a monocyclic ring or a fused ring, preferably a monocyclic ring or a fused ring composed of 2 to 8 rings, and more preferably a monocyclic ring or a fused ring composed of 2 to 4 rings. The number of heteroatoms constituting a ring of the heteroaryl group is preferably 1 to 3. As the heteroatom constituting the ring of the heteroaryl group, a nitrogen atom, an oxygen atom, or a sulfur atom is preferable. It is preferable that the heteroaryl group is a 5-membered ring or a 6-membered ring. The number of carbon atoms constituting the ring of the heteroaryl group is preferably 3 to 30, more preferably 3 to 18, and still more preferably 3 to 12. Examples of the heteroaryl group include a pyridine ring, a piperidine ring, a furan ring group, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazine ring, a benzoquinoline ring, and a thiadiazole ring.

The alkyl group, the alkenyl group, the alkynyl group, the aralkyl group, the aryl group, and the heteroaryl group may have a substituent or may be unsubstituted.

Examples of the substituent include substituents described in paragraph 0030 of JP2018-154672A. Examples of the substituent include an alkyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, an alkylthio group, an arylthio group, an aromatic heterocyclic thio group, a sulfonyl group, a hydroxy group, a mercapto group, a halogen atom, a cyano group, a sulfo group, and a carboxy group. Among these, as the substituent, an alkyl group, an aryl group, an alkoxy group, an aryloxy group, an aromatic heterocyclic oxy group, an acyl group, an alkoxycarbonyl group, an aryloxycarbonyl group, an acyloxy group, an alkylthio group, an arylthio group, an aromatic heterocyclic thio group, a sulfonyl group, a hydroxy group, a mercapto group, a halogen atom, a cyano group, a sulfo group, or a carboxy group is preferable.

The "number of carbon atoms" in the substituent means the "total carbon number" of the substituent. In addition, with regard to details of each substituent, reference can be made to substituents described in paragraphs 0031 to 0035 of JP2018-154672A.

($X^A$ and $X^B$)

$X^A$ and $X^B$ each independently represent a monovalent substituent.

As the substituent of $X^A$ and $X^B$, a group having an active hydrogen is preferable, —OH, —SH, —COOH, —$SO_3H$, —$NR^{X1}R^{X2}$, —$NHCOR^{X1}$, —$CONR^{X1}R^{X2}$, —$NHCONR^{X1}R^{X2}$, —$NHCOOR^{X1}$, —$NHSO_2R^{X1}$, —$B(OH)_2$, or $PO(OH)_2$ is more preferable, and —OH, —SH, or $NR^{X1}R^{X2}$ is still more preferable.

$R^{X1}$ and $R^{X2}$ each independently represent a hydrogen atom or a monovalent substituent. Examples of the substituent include an alkyl group, an alkenyl group, an alkynyl group, an aryl group, or a heteroaryl group. Among these, the substituent is preferably an alkyl group. The alkyl group is preferably linear or branched. Details of the alkyl group, alkenyl group, alkynyl group, aryl group, and heteroaryl group are synonymous with the ranges described in $G^A$ and $G^B$.

[Ring A and Ring B]

The ring A and the ring B each independently represent an aromatic ring or a heteroaromatic ring.

The aromatic ring and heteroaromatic ring may be a monocyclic ring or a fused ring.

Examples of the aromatic ring and the heteroaromatic ring include a benzene ring, a naphthalene ring, a pentalene ring, an indene ring, an azulene ring, a heptalene ring, an indecene ring, a perylene ring, a pentacene ring, an acenaphthalene ring, a phenanthrene ring, an anthracene ring, a naphthacene ring, a chrysene ring, a triphenylene ring, a fluorene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indridine ring, an indole ring, a benzofuran ring, a benzothiophene ring, an isobenzofuran ring, a quinolizine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxthin ring, a phenothiazine ring, and a phenazine ring.

Among these, as the ring A and the ring B, an aromatic ring is preferable, and a benzene ring or a naphthalene ring is more preferable.

The aromatic ring may be unsubstituted or may have a substituent. Examples of the substituent include the substituents described in $G^A$ and $G^B$.

$X^A$ and $G^A$, or $X^B$ and $G^B$ may be bonded to each other to form a ring, and in a case of a plurality of $G^A$'s or a plurality of $G^B$'s, the plurality of $G^A$'s or the plurality of $G^B$'s may be bonded to each other to form a ring. The ring is preferably a 5-membered ring or a 6-membered ring. The ring may be a monocyclic ring or a complex ring.

In a case where $X^A$ and $G^A$, $X^B$ and $G^B$, $G^A$'s, or $G^B$'s are bonded to each other to form a ring, these may be directly bonded to form a ring, or may be bonded through a divalent linking group selected from the group consisting of an alkylene group, —CO—, —O—, —NH—, —BR—, and a combination thereof to form a ring.

It is preferable that $X^A$ and $G^A$, $X^B$ and $G^B$, $G^A$'s, or $G^B$'s are bonded to each other through —BR— to form a ring.

R represents a hydrogen atom or a monovalent substituent. Examples of the substituent include the substituents described in $G^A$ and $G^B$, and an alkyl group or an aryl group is preferable.

(kA and kB)

kA represents an integer of 0 to $n_A$, kB represents an integer of 0 to $n_B$, $n_A$ represents the maximum integer substitutable for the ring A, and $n_B$ represents the maximum integer substitutable for the ring B.

kA and kB are each independently preferably 0 to 4, more preferably 0 to 2, and particularly preferably 0 or 1. In addition, it is preferable not to include a case where kA and kB simultaneously represent 0 (zero).

From the viewpoint of light resistance, the squarylium coloring agent represented by Formula 1 is preferably a squarylium coloring agent represented by Formula 2.

(2)

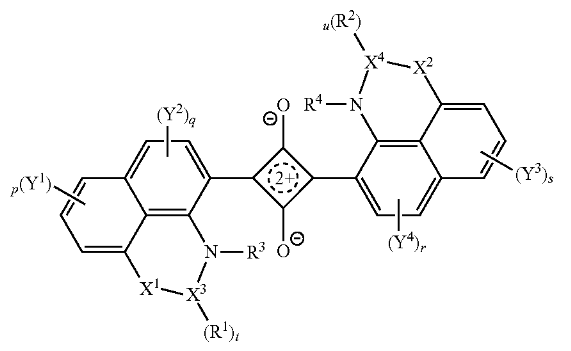

In Formula 2, $R^1$ and $R^2$ each independently represent a monovalent substituent, $R^3$ and $R^4$ each independently represent a hydrogen atom or an alkyl group, $X^1$ and $X^2$ each independently represent an oxygen atom or —N($R^5$)—, $R^5$ represents a hydrogen atom, an alkyl group, an aryl group, or a heteroaryl group, $X^3$ and $X^4$ each independently represent a carbon atom or a boron atom, t and u each represent 1 in a case where $X^3$ and $X^4$ represent a boron atom, and each represent 2 in a case where $X^3$ and $X^4$ represent a carbon atom, $Y^1$, $Y^2$, $Y^3$, and $Y^4$ each independently represent a monovalent substituent, $Y^1$, $Y^2$, $Y^3$, and $Y^4$ may be bonded to each other to form a ring, in a case of a plurality of $Y^1$'s, a plurality of $Y^2$'s, a plurality of $Y^3$'s, or a plurality of $Y^4$'s, the plurality of $Y^1$'s, the plurality of $Y^2$'s, the plurality of $Y^3$'s, or the plurality of $Y^4$'s may be bonded to each other to form a ring, p and s each independently represent an integer of 0 to 3, and q and r each independently represent an integer of 0 to 2.

($R^1$ and $R^2$)

$R^1$ and $R^2$ may be the same or different from each other, but it is preferable that $R^1$ and $R^2$ are the same. In addition, in a case where t and u each represent 2, two $R^1$'s may be the same or different from each other and two $R^2$'s may be the same or different from each other, and it is preferable that two $R^1$'s are the same and two $R^2$'s are the same.

Examples of the monovalent substituent represented by $R^1$ and $R^2$ include the same monovalent substituents as $G^A$ and $G^B$. Among these, as $R^1$ and $R^2$, an aryl group is preferable. The aryl group may have a monovalent substituent or may be unsubstituted. The number of carbon atoms in the aryl group is preferably 6 to 30, more preferably 6 to 20, and still more preferably 6 to 14.

($Y^1$, $Y^2$, $Y^3$, and $Y^4$)

Examples of the monovalent substituent represented by $Y^1$, $Y^2$, $Y^3$, and $Y^4$ include the same monovalent substituents as $G^A$ and $G^B$.

(p, q, r, and s)

p, q, r and s are preferably 0. That is, it is preferable that $Y^1$, $Y^2$, $Y^3$, and $Y^4$ are not present in Formula 2.

($X^1$ and $X^2$)

$X^1$ and $X^2$ may be the same or different from each other, but it is preferable that $X^1$ and $X^2$ are the same. It is preferable that $X^1$ and $X^2$ are —N($R^5$)—.

($R^5$)

The alkyl group, the aryl group, and the heteroaryl group represented by $R^5$ may be unsubstituted or may have a monovalent substituent. Examples of the monovalent substituent include the same monovalent substituents as $G^A$ and $G^B$.

The number of carbon atoms in the alkyl group is preferably 1 to 20, more preferably 1 to 10, still more preferably 1 to 4, and particularly preferably 1 or 2. The alkyl group may be linear or branched.

The number of carbon atoms in the aryl group is preferably 6 to 20 and more preferably 6 to 12.

The heteroaryl group may be monocyclic or polycyclic. The number of heteroatoms constituting a ring of the heteroaryl group is preferably 1 to 3. As the heteroatom constituting the ring of the heteroaryl group, a nitrogen atom, an oxygen atom, or a sulfur atom is preferable. The number of carbon atoms constituting the ring of the heteroaryl group is preferably 3 to 30, more preferably 3 to 18, and more preferably 3 to 12.

$R^5$ is preferably a hydrogen atom, a methyl group, or an ethyl group, more preferably a hydrogen atom or a methyl group, and still more preferably a hydrogen atom.

($X^3$ and $X^4$)

$X^3$ and $X^4$ may be the same or different from each other, but it is preferable that $X^3$ and $X^4$ are the same. It is preferable that $X^3$ and $X^4$ are a boron atom.

($R^3$ and $R^4$)

The number of carbon atoms in the alkyl group represented by $R^3$ and $R^4$ is preferably 1 to 4 and more preferably 1 or 2. The alkyl group may be linear or branched. Examples of the alkyl group include a methyl group, an ethyl group, a n-propyl group, an isopropyl group, a n-butyl group, and an isobutyl group. $R^3$ and $R^4$ are each independently preferably a hydrogen atom, a methyl group, or an ethyl group, more preferably a hydrogen atom or a methyl group, and still more preferably a hydrogen atom.

A molecular weight of the squarylium coloring agent represented by Formula 1 is preferably 100 to 2,000 and more preferably 150 to 1,000.

The squarylium coloring agent represented by Formula 1 is described in detail in JP2011-2080101A, and the compound described therein can be suitably used as the squarylium coloring agent in the present disclosure.

Each of the squarylium coloring agent represented by Formula 1 and the squarylium coloring agent represented Formula 2 may be tautomers thereof. For the tautomers, for example, description of paragraph 0034 of WO2016/136783A can be referred to.

Specific examples of the squarylium coloring agent represented by Formula 1 or Formula 2 described above are shown below (compounds S-1 to S-45).

However, the squarylium coloring agent represented by Formula 1 or Formula 2 is not limited to the following specific examples. In the following, "Me" represents a methyl group, and "Ph" represents a phenyl group.

-continued
S-1
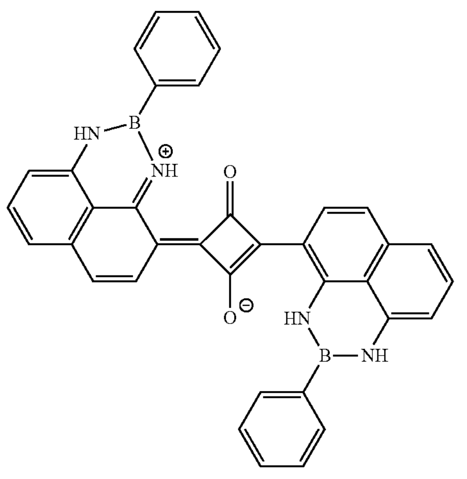
S-4
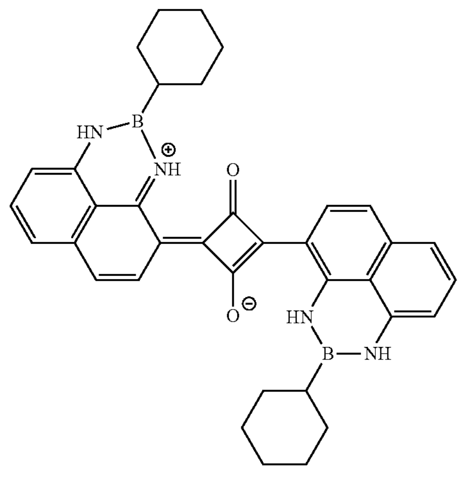
S-2
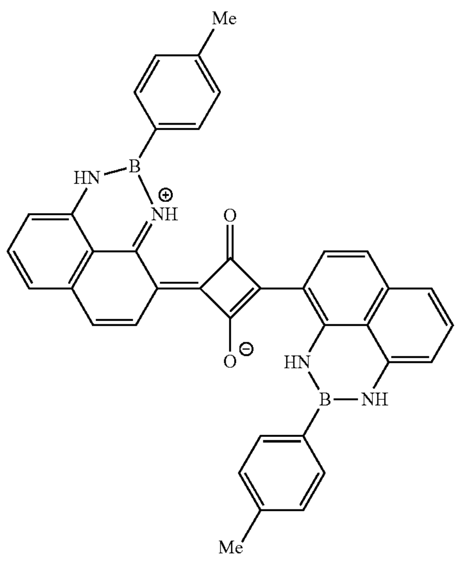
S-5
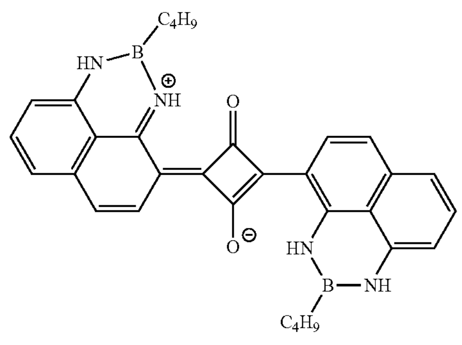
S-3
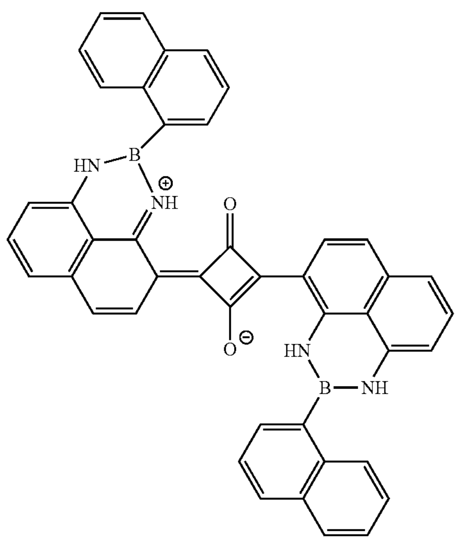
S-6
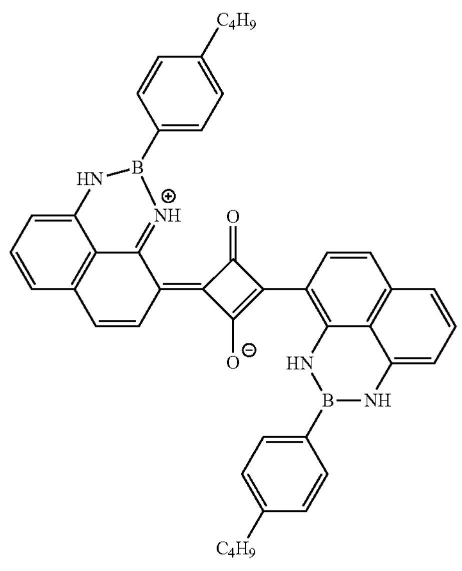

-continued
S-7
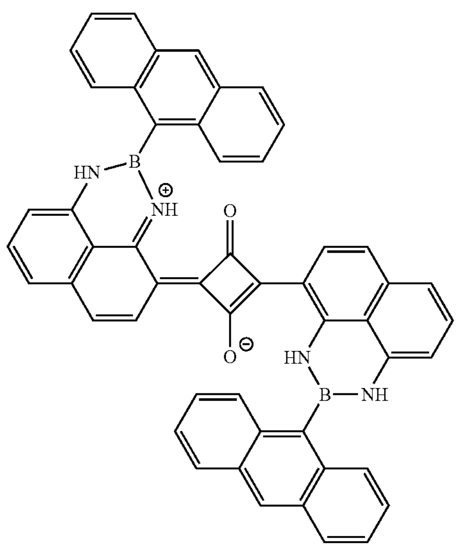
S-8
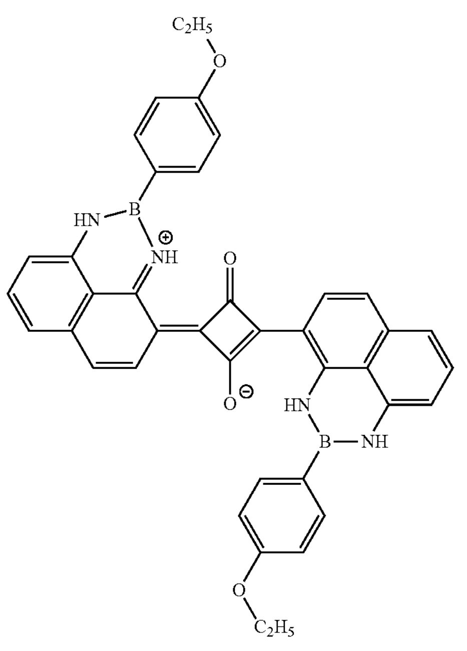
-continued
S-9
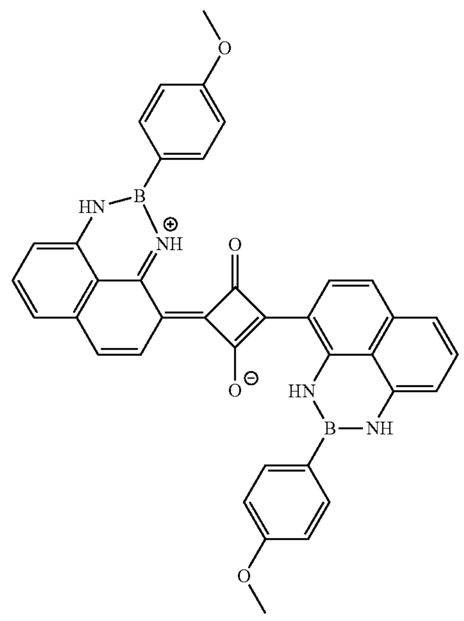
S-10
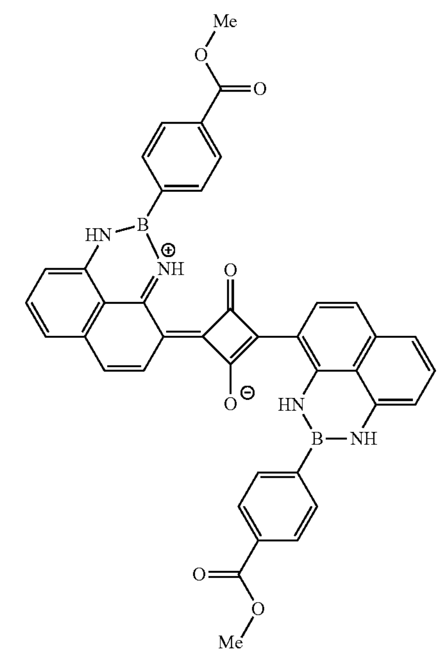

-continued
S-11
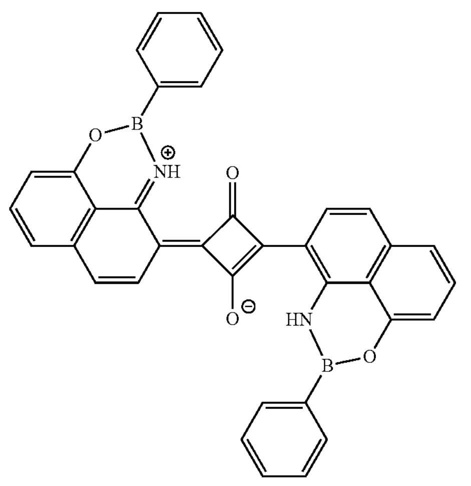
S-12
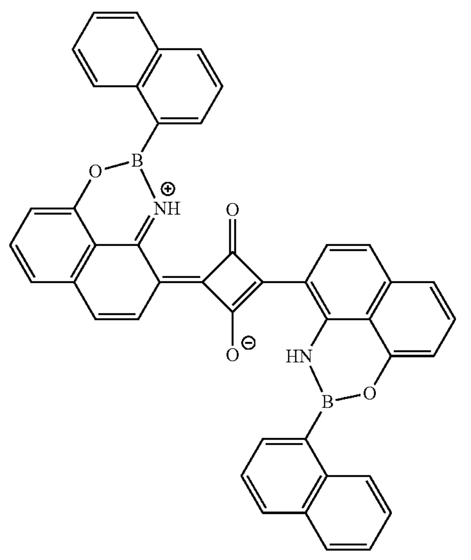
S-13
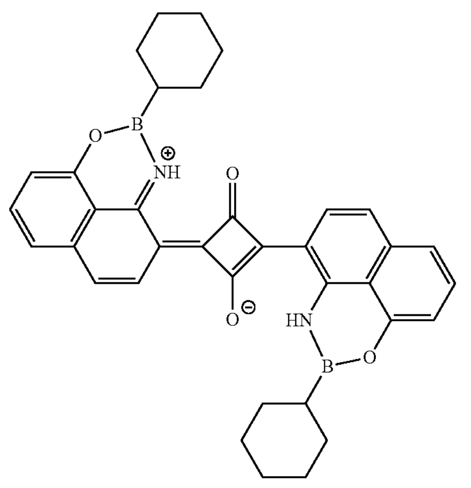
-continued
S-14
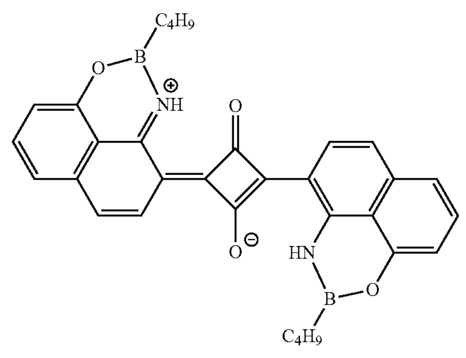
S-15
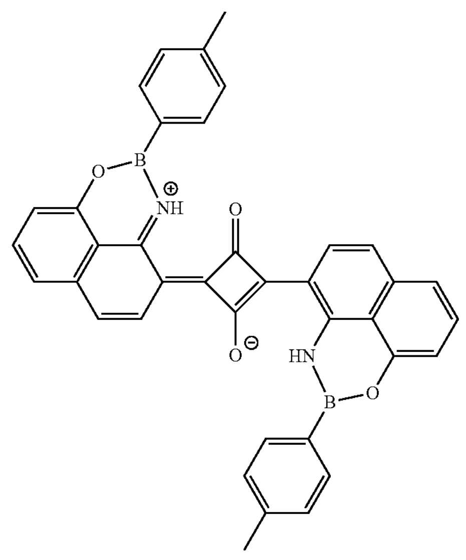
S-16
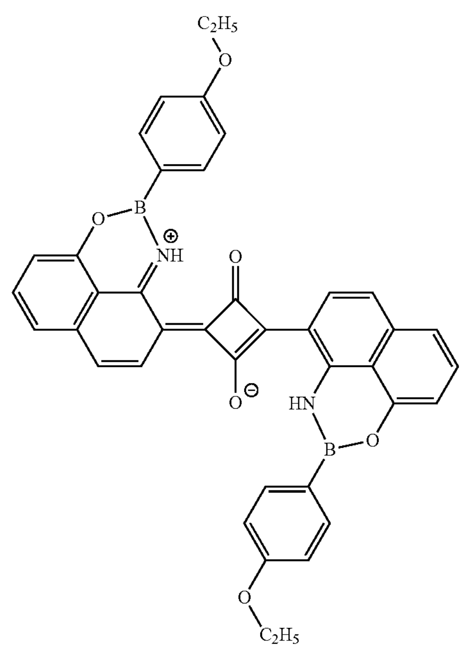

-continued
S-17
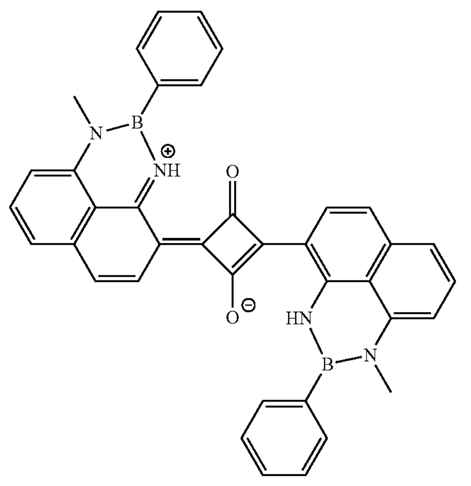
S-18
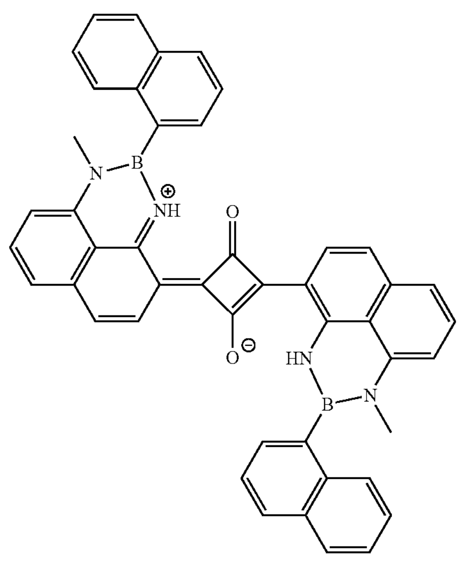
S-19
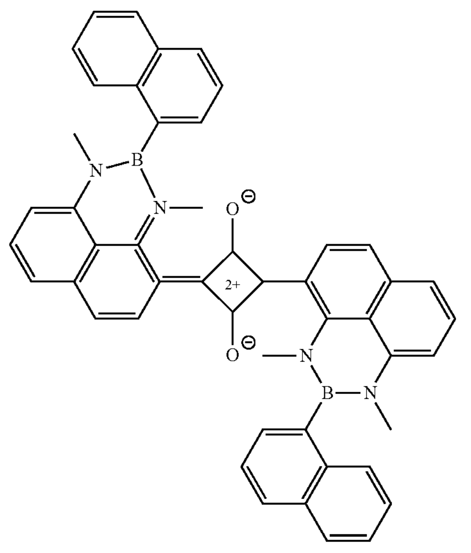
-continued
S-20
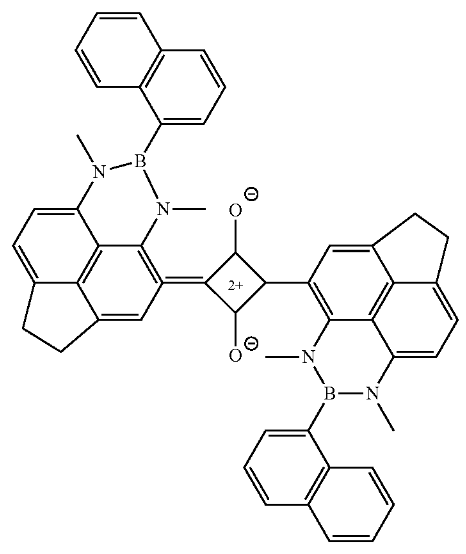
S-21
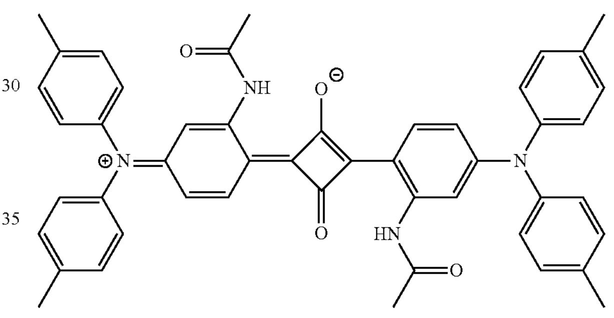
S-22
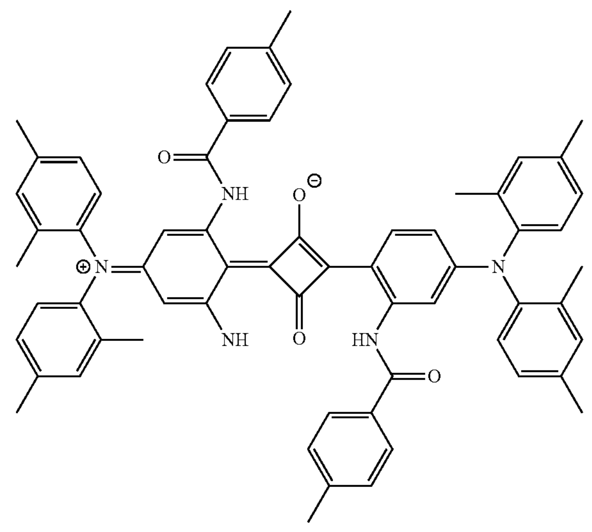

-continued
S-23
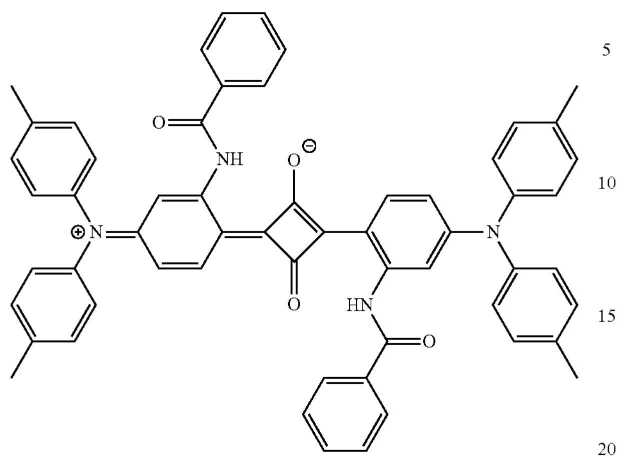
S-24
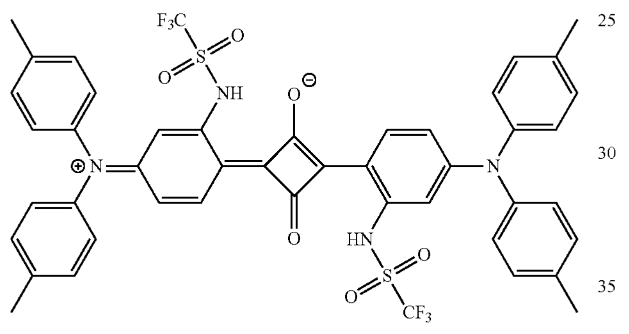
S-25
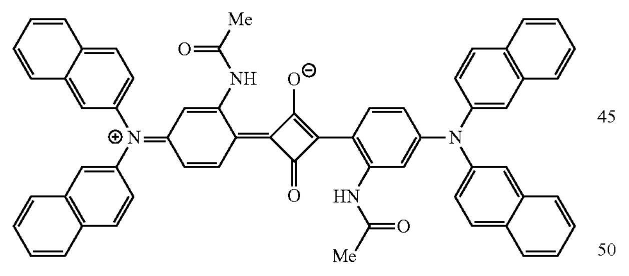
S-26
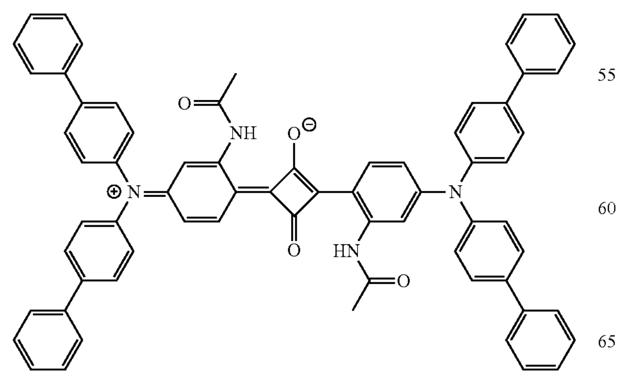
-continued
S-27
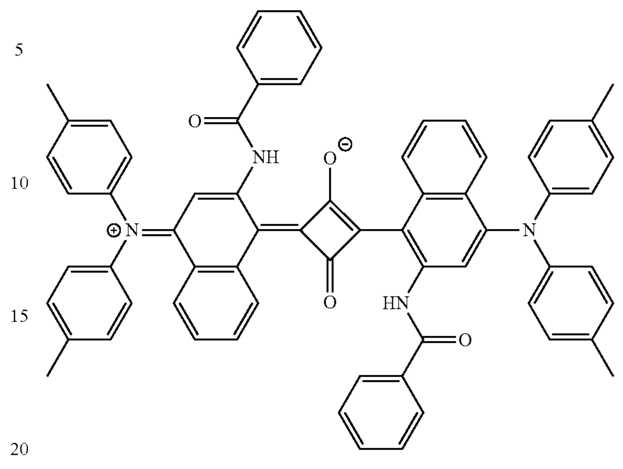
S-28
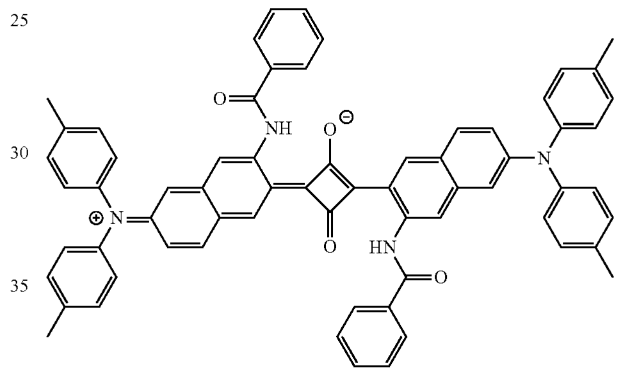
S-29
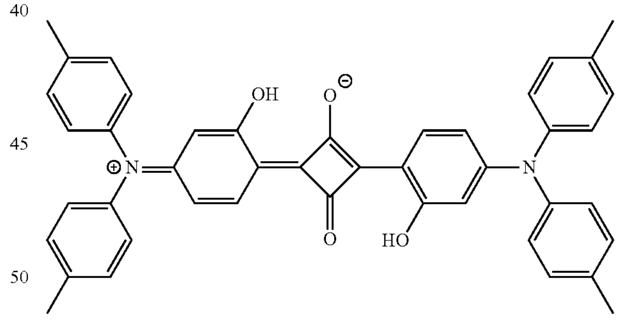
S-30
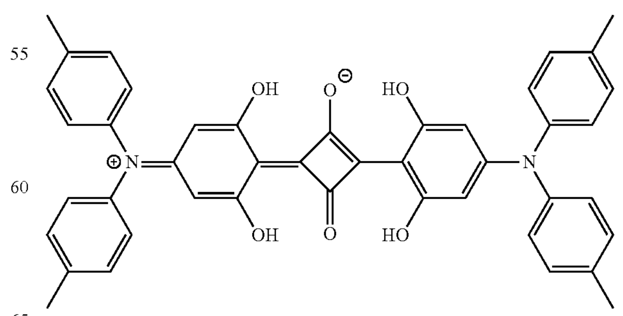

-continued
S-31
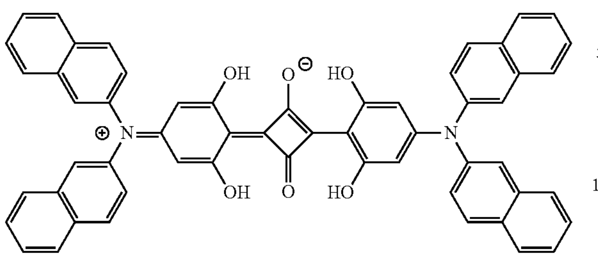
S-32
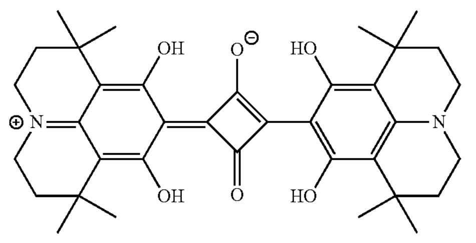
S-33
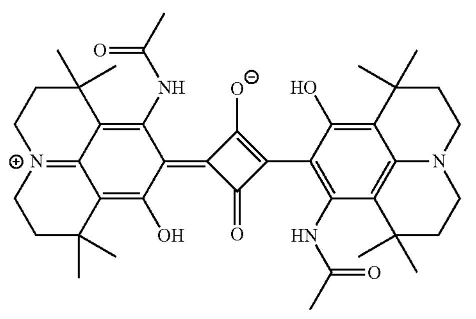
S-34
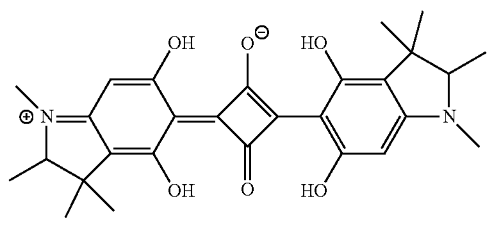
S-35
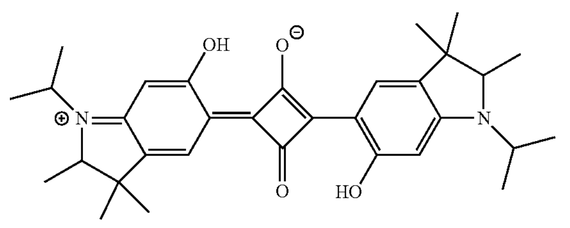
-continued
S-36
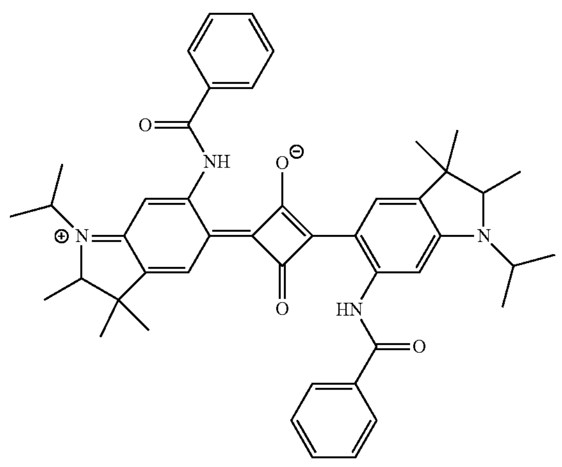
S-37
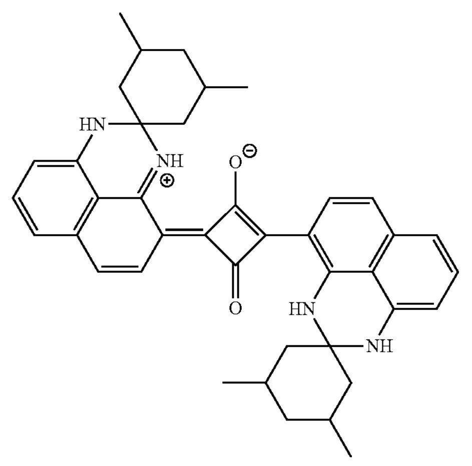
S-38
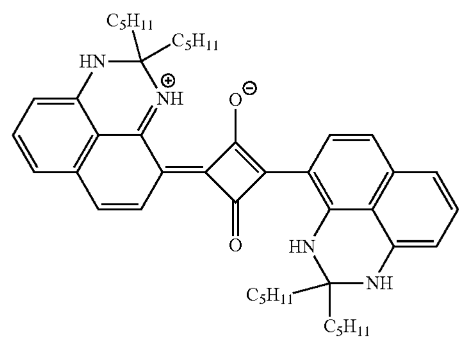
S-39
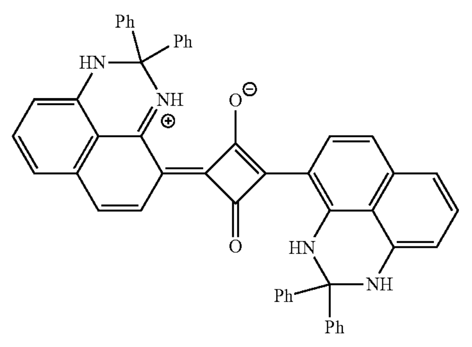

-continued
S-40
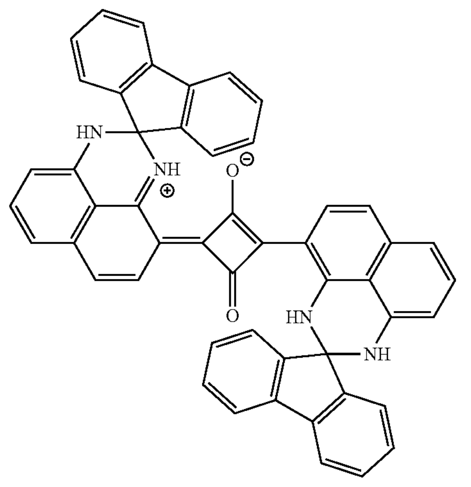
S-41
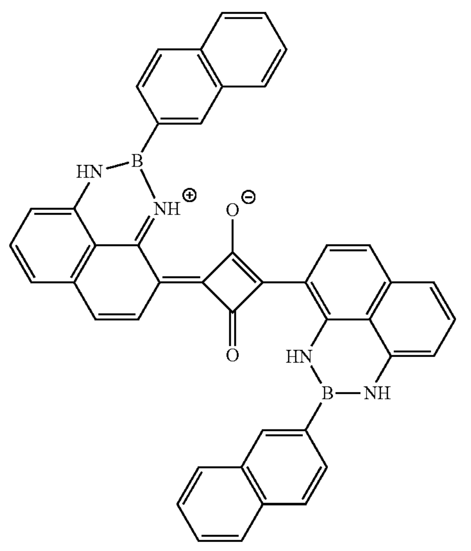
S-42
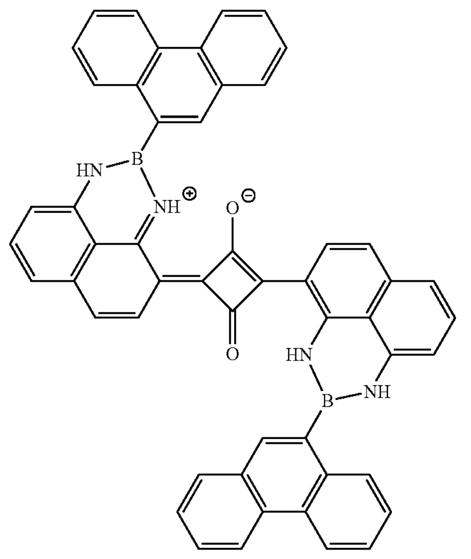
-continued
S-43
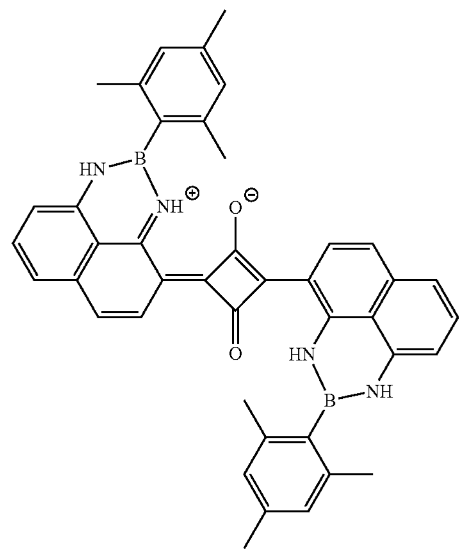
S-44
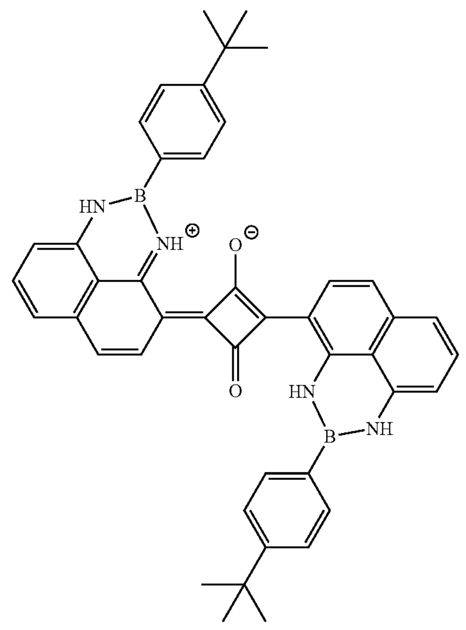

-continued

S-45

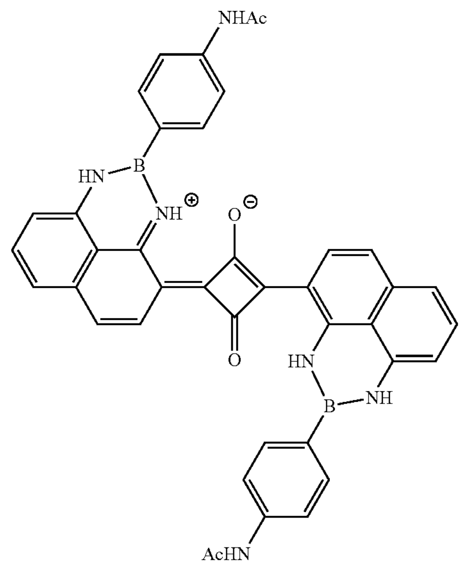

From the viewpoint of improving readability and readability after the passage of time, the squarylium coloring agent represented by Formula 1 is preferably the compound S-1, S-3, S-7, S-37, S-41, S-42, S-43, S-44, or S-45.

It is preferable that the near-infrared absorbing coloring agent (D) is dispersed in the ink in a form of particles. From the viewpoint of light resistance, a volume average particle size of the near-infrared absorbing coloring agent (D) is preferably 10 nm or more, more preferably 15 nm or more, still more preferably 20 nm or more, and particularly preferably 50 nm or more. In addition, from the viewpoint of dispersibility and jettability, the volume average particle size of the near-infrared absorbing coloring agent (D) is preferably 400 nm or less, more preferably 300 nm or less, and still more preferably 200 nm or less.

In a case where the near-infrared absorbing coloring agent (D) is coated with a dispersant or the like, the volume average particle size of the near-infrared absorbing coloring agent (D) refers to a volume average particle size in the coated state.

The volume average particle size can be measured by a dynamic light scattering method using Zetasizer Nano ZS (manufactured by Malvern Panalytical Ltd) as a measuring device.

It is preferable that the near-infrared absorbing coloring agent (D) is dispersed using a disperser. Examples of the disperser include a circulation-type beads mill, a ball mill, a sand mill, an attritor, a roll mill, an agitator, a Henschel mixer, a colloid mill, an ultrasound homogenizer, a pearl mill, a wet-type jet mill, and a paint shaker.

A content of the near-infrared absorbing coloring agent (D) is preferably 0.1% by mass to 20% by mass, more preferably 0.1% by mass to 10% by mass, and still more preferably 0.3% by mass to 7% by mass with respect to the total amount of the ink.

<Dispersant>

The ink according to the embodiment of the present disclosure preferably contains at least one dispersant.

The dispersant has a function of dispersing the near-infrared absorbing coloring agent (D).

A weight-average molecular weight of the dispersant is preferably 100,000 or less, more preferably 75,000 or less, and still more preferably 50,000 or less. In a case where the weight-average molecular weight of the dispersant is 100,000 or less, since a diffusion rate of the dispersant in a dispersion medium is improved, an article with a recorded image, having excellent readability, is obtained.

The weight-average molecular weight of the dispersant is preferably 1,000 or more, more preferably 2,000 or more, and still more preferably 3,000 or more. In a case where the weight-average molecular weight of the dispersant is 1,000 or more, since compatibility with the dispersion medium is not too high, it is possible to stably disperse the near-infrared absorbing coloring agent represented by Formula 1 by the dispersant.

The weight-average molecular weight means a value measured by gel permeation chromatography (GPC). For the measurement by gel permeation chromatography (GPC), HLC (registered trademark)-8020GPC (manufactured by Tosoh Corporation) is used as a measuring device, three columns of TSKgel (registered trademark) Super Multipore HZ-H (4.6 mmID×15 cm, manufactured by Tosoh Corporation) are used as a column, and tetrahydrofuran (THF) is used as an eluent. In addition, the measurement is performed under measurement conditions of a sample concentration of 0.45% by mass, a flow rate of 0.35 ml/min, a sample injection volume of 10 μl, and a measurement temperature of 40° C. using an RI detector. A calibration curve is created using 8 samples of "F-40", "F-20", "F-4", "F-1", "A-5000", "A-2500", "A-1000", and "n-propylbenzene" which are "Standard Samples TSK standard, polystyrene" (manufactured by TOSOH Corporation).

The dispersant is preferably a polymer, and the polymer may be any of a random polymer, a block polymer, or a graft polymer.

Among these, from the viewpoint of readability after the passage of time, a block polymer is preferable as the dispersant. For example, the block polymer has an adsorption block having an adsorptive group, which is adsorbed onto the near-infrared absorbing coloring agent represented by Formula 1, and a dispersant-friendly block which has a functional group having affinity with the dispersion medium. In the block polymer, since the adsorptive group has low shielding properties and high mobility, the block polymer is adsorbed onto the near-infrared absorbing coloring agent represented by Formula 1 at a high rate. Therefore, in a case where the dispersant is a block polymer, the readability is further improved. In addition, in the block polymer, since the adsorptive groups are gathered, the block polymer has a high adsorption force to the near-infrared absorbing coloring agent represented by Formula 1. Therefore, in a case where the dispersant is a block polymer, the readability after the passage of time is further improved.

It is preferable that the dispersant have a basic functional group or an acidic functional group. In a case where a pigment derivative described later is contained in the ink, a combination of a dispersant having a basic functional group and a pigment derivative having an acidic functional group or a combination of a dispersant having an acidic functional group and a pigment derivative having a basic functional group is preferable. In a case where a dispersant having a basic functional group and a pigment derivative having an acidic functional group are contained in the ink in combination, due to acid-base interaction, the pigment derivative is easily adsorbed onto the dispersant. Similarly, in a case where a dispersant having an acidic functional group and a pigment derivative having a basic functional group are contained in the ink in combination, due to the acid-base interaction, the pigment derivative is easily adsorbed onto the dispersant.

Due to steric repulsion between the dispersants, the near-infrared absorbing coloring agent represented by Formula 1 can be stably dispersed in the ink, which improves temporal stability. As a result, the readability after the passage of time is improved.

Examples of the basic functional group include an amino group, an amide group, and an imino group. The dispersant may have only one basic functional group or two or more basic functional groups.

Examples of the acidic functional group include a carboxy group and a sulfo group. The dispersant may have only one acidic functional group or two or more acidic functional groups.

In a case where the dispersant is a dispersant having a basic functional group, from the viewpoint of improving the readability and the readability after the passage of time, a base value of the dispersant is preferably 15 mgKOH/g or more, more preferably 20 mgKOH/g or more, and still more preferably 25 mgKOH/g or more. The upper limit of the base value of the dispersant is not particularly limited, but is, for example, 40 mgKOH/g.

In the present disclosure, the base value is a value measured by a perchloric acid method specified by JIS K 2501: 2003. The base value is obtained as milligrams (mg) of potassium hydroxide equivalent to hydrochloric acid or perchloric acid required to neutralize all basic components contained in 1 g of a sample.

In a case where the dispersant is a dispersant having an acidic functional group, from the viewpoint of improving the readability and the readability after the passage of time, an acid value of the dispersant is preferably 15 mgKOH/g or more, more preferably 20 mgKOH/g or more, and still more preferably 25 mgKOH/g or more. The upper limit of the acid value of the dispersant is not particularly limited, but is, for example, 40 mgKOH/g.

In the present disclosure, the acid value is a value measured by a method described in JIS K0070: 1992. The acid value is obtained as milligrams (mg) of potassium hydroxide required to neutralize all acidic components contained in 1 g of a sample.

The dispersant may be a commercially available product. Examples of the commercially available product thereof include SOLSPERSE (registered trademark) series (for example, SOLSPERSE 16000, 21000, 32000, 35000, 41000, 41090, 43000, 44000, 46000, 54000, 55000, 71000, and the like) from The Lubrizol Corporation; DISPERBYK (registered trademark) series (for example, DISPERBYK 102, 110, 111, 118, 170, 190, 194N, 2001, 2013, 2015, 2090, 2096, and the like) from BYK-Chemie GmbH; TEGO (registered trademark) Dispers series (for example, TEGO Dispers 610, 6105, 630, 651, 655, 750W, 755W, and the like) from Evonik Industries AG; DISPARLON (registered trademark) series (for example, DA-375, DA-1200, and the like) from Kusumoto Chemicals, Ltd.; FLOREN series (for example, WK-13E, G-700, G-900, GW-1500, GW-1640, WK-13E, and the like) from KYOEISHA CHEMICAL Co., LTD.; and EFKA (registered trademark) series (for example, EFKA PX 4701, EFKA PX 4731, EFKA PX 4732, and the like) from BASF SE.

From the viewpoint of improving the readability and the readability after the passage of time, a content of the dispersant is preferably 0.7% by mass to 5% by mass and more preferably 0.8% by mass to 4% by mass with respect to the total amount of the ink.

A ratio of the content of the dispersant to the content of the near-infrared absorbing coloring agent represented by Formula 1 is preferably 0.1 to 20, more preferably 0.2 to 5, and still more preferably 0.5 to 5, based on mass.

An SP value of the dispersant is not particularly limited as long as a difference between the SP value of the polymerizable monomer and the SP value of the dispersant is 3.8 $MPa^{1/2}$ to 16.0 MPa/2. From the viewpoint of dispersion stability, the SP value of the dispersant is preferably 21 $MPa^{1/2}$ to 34 $MPa^{1/2}$ and more preferably 24 $MPa^{1/2}$ to 34 $MPa^{1/2}$.

The SP value of the dispersant is calculated, for example, by the following K. W. SUH, J. M. CORBETT's equation (Journal of Applied Polymer Science, 12, 2359, 1968).

$$SP\ \text{value}=\{(V_{ml})^{1/2}\times\delta H+(V_{mh})^{1/2}\times\delta D\}/\{(V_{ml})^{1/2}+(V_{ml})^{1/2}+(V_{mh})^{1/2}\}$$

$V_{ml}$, $V_{mh}$, δH, and δD are values calculated by adding n-hexane at a measurement temperature of 20° C. to a solution obtained by dissolving 0.5 g (solid content) of the dispersant in 10 mL of a good solvent, denoting a titer at a turbid point caused by the addition of n-hexane by H (mL), adding deionized water at a measurement temperature of 20° C. to a solution obtained by dissolving 0.5 g (solid content) of the dispersant in 10 mL of a good solvent, denoting a titer at a turbid point caused by the addition of deionized water by D (mL), and applying H and D into the following equations.

$$V_{ml}=(\text{molecular volume of good solvent})\times(\text{molecular volume of }n\text{-hexane})/\{(1-V_H)\times(\text{molecular volume of }n\text{-hexane})+V_H\times(\text{molecular volume of good solvent})\}$$

$$V_{mh}=(\text{molecular volume of good solvent})\times(\text{molecular volume of deionized water})/\{(1-V_D)\times(\text{molecular volume of deionized water})+V_D\times(\text{molecular volume of good solvent})\}$$

$$V_H=H/(10+H)$$

$$V_D=D/(10+D)$$

$$\delta H=(SP\ \text{value of good solvent})\times 10/(10+H)+(SP\ \text{value of }n\text{-hexane})\times H/(10+H)$$

$$\delta D=(SP\ \text{value of good solvent})\times 10/(10+D)+(SP\ \text{value of deionized water})\times D/(10+D)$$

The molecular volume of n-hexane is 130.3 mL/mol, and the molecular volume of deionized water is 18 mL/mol.

In addition, the SP value of n-hexane is 7.27 $(cal/cm^3)^{1/2}$, and the SP value of deionized water is 23.39 $(cal/cm^3)^{1/2}$.

The good solvent used to dissolve the dispersant is not particularly limited as long as it is a solvent capable of dissolving the dispersant, and can be appropriately selected. Examples of the good solvent include acetone.

The molecular volume of acetone is 74.4 mL/mol, and the SP value of acetone is 9.72 $(cal/cm^3)^{1/2}$.

In a case where acetone is used as the good solvent, 74.4 and 9.72 are applied into the above equations as "molecular volume of good solvent" and "SP value of good solvent" respectively.

The SP value of each solvent is a value calculated using HSPiP (version 4.1.07) software.

The molecular volume (mL/mol) of each solvent is a value obtained by dividing molecular weight (g/mol) by density (g/mL).

In addition, the unit of the obtained SP value is $(cal/cm^3)^{1/2}$. The unit can be converted into $MPa^{1/2}$ from $(cal/cm^3)^{1/2}$, based on 1 $(cal/cm^3)^{1/2}\approx 2.05$ $MPa^{1/2}$.

In the ink according to the embodiment of the present disclosure, the difference between the SP value of the polymerizable monomer and the SP value of the dispersant is 3.8 $MPa^{1/2}$ to 16.0 $MPa^{1/2}$. The above-described difference means an absolute value of a value obtained by subtracting the SP value of one of the polymerizable monomer or the dispersant from the SP value of the other.

It is presumed that, in a case where the above-described difference in Sp values is 3.8 $MPa^{1/2}$ or more, the dispersant is unlikely to be separated from the surface of the near-infrared absorbing coloring agent represented by Formula 1, and the dispersion stability of the near-infrared absorbing coloring agent by Formula 1 may be improved. On the other hand, it is presumed that, in a case where the above-described difference in SP values is 16.0 $MPa^{1/2}$ or less, the dispersant adsorbed onto the surface of the near-infrared absorbing coloring agent represented by Formula 1 may spread appropriately, which may make it difficult for the near-infrared absorbing coloring agents represented by Formula 1 to be aggregated with each other. As a result, an article with a recorded image having excellent readability is obtained. In addition, in the ink according to the embodiment of the present disclosure, the near-infrared absorbing coloring agent represented by Formula 1 can be stably dispersed for a long period of time by the dispersant, which makes it possible to obtain an article with a recorded image having excellent readability after the passage of time.

From the viewpoint of improving the readability and the readability after the passage of time, the above-described difference in SP values is preferably 4.5 $MPa^{1/2}$ to 15.5 $MPa^{1/2}$ and more preferably 5.0 $MPa^{1/2}$ to 15.2 $MPa^{1/2}$ <Pigment Derivative>

The ink according to the embodiment of the present disclosure preferably further contains at least one pigment derivative.

The pigment derivative is a compound having a structure derived from a pigment in the molecule, and having a molecular weight of less than 1,000.

In a case where the ink contains a pigment derivative, the pigment derivative and the near-infrared absorbing coloring agent represented by Formula 1 have π-π interaction, and the pigment derivative and the dispersant have acid-base interaction. Therefore, the near-infrared absorbing coloring agent represented by Formula 1 is more stably dispersed by the dispersant, and the temporal stability of the ink is improved. As a result, the readability after the passage of time is improved.

It is preferable that the pigment derivative has a basic functional group or an acidic functional group.

Examples of the basic functional group include an amino group, an amide group, and an imino group. The pigment derivative may have only one basic functional group or two or more basic functional groups.

Examples of the acidic functional group include a carboxy group and a sulfo group. The pigment derivative may have only one acidic functional group or two or more acidic functional groups.

The pigment derivative having an acidic functional group is preferably represented by Formula 3.

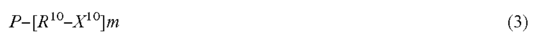

$$P-[R^{10}-X^{10}]m \qquad (3)$$

In Formula 3, P represents a coloring agent residue, $R^{10}$ represents a divalent linking group, and $X^{10}$ each independently represent a carboxy group or a sulfo group. m represents the maximum integer substitutable for P.

(P)

Examples of P include a diketopyrrolopyrrole-based coloring agent; an azo-based coloring agent such as azo, disazo, or polyazo; a phthalocyanine-based coloring agent; an anthraquinone-based coloring agent such as diaminoanthraquinone, anthrapyrimidine, flavanthrone, anthanthrone, indanthrone, pyranthrone, or violanthrone; a quinacridone-based coloring agent; a dioxazine-based coloring agent; a perinone-based coloring agent; a perylene-based coloring agent; a thioindigo-based coloring agent; an isoindoline-based coloring agent; an isoindolinone-based coloring agent; a quinophthalone-based coloring agent; and residues of a threne-based coloring agent and a metal complex-based coloring agent.

Among these, as P, from the viewpoint of improving the readability and the readability after the passage of time, a diketopyrrolopyrrole-based coloring agent, a phthalocyanine-based coloring agent, an anthraquinone-based coloring agent, or a dioxazine-based coloring agent residue is preferable; and a diketopyrrolopyrrole-based coloring agent, a phthalocyanine-based coloring agent, or an anthraquinone-based coloring agent is more preferable.

($R^{10}$)

Examples of $R^{10}$ include an alkylene group, an arylene group, a divalent group selected from the group consisting of —O—, —S—, —C═O—, $—NR^{30}—$, $—CONR^{30}—$, $—SO_2NR^{30}$, $—NR^{30}CO—$, and $—NR^{30}SO_2—$, a divalent group obtained by combining two or more of these groups, and a single bond. $R^{30}$ represents a hydrogen atom or an alkyl group.

Among these, $R^{10}$ is preferably a single bond.

($X^{10}$)

$X^{10}$ is preferably a sulfo group. A plurality of $X^{10}$'s may be the same or different from each other, and it is preferable that $X^{10}$'s are the same.

(m)

m is preferably 1 to 10, preferably 1 to 5, and more preferably 1 to 3.

The ink may contain one pigment derivative or two or more pigment derivatives.

From the viewpoint of improving the readability and the readability after the passage of time, a content of the pigment derivative is preferably 0.005% by mass to 0.1% by mass with respect to the total amount of the ink.

From the viewpoint of improving the readability and the readability after the passage of time, the content of the pigment derivative is preferably 0.12% by mass to 15% by mass and more preferably 0.15% by mass to 12% by mass with respect to the total amount of the near-infrared absorbing coloring agent represented by Formula 1.

The ink according to the embodiment of the present disclosure may further contain the following other components.

(Polymerization Inhibitor)

The ink according to the embodiment of the present disclosure preferably contains a polymerization inhibitor. The ink may contain one polymerization inhibitor or two or more polymerization inhibitors.

Examples of the polymerization inhibitor include a hydroquinone compound, phenothiazine, catechols, alkylphenols, alkylbisphenols, zinc dimethyldithiocarbamate, copper dimethyldithiocarbamate, copper dibutyldithiocarbamate, copper salicylate, a thiodipropionic acid ester, mercaptobenzimidazole, phosphites, a nitrosamine compound, a hindered amine compound, and a nitroxyl radical.

Among these, as the polymerization inhibitor, at least one compound selected from the group consisting of a nitrosamine compound, a hindered amine compound, a hydroquinone compound, and a nitroxyl radical is preferable; at least one compound selected from the group consisting of a nitrosamine compound, a hydroquinone compound, and a nitroxyl radical is more preferable, and it is still more preferable to include a nitrosamine compound, a hydroquinone compound, or a nitroxyl radical.

Examples of the nitrosamine compound include an N-nitroso-N-phenylhydroxylamine aluminum salt and N-nitroso-N-phenylhydroxylamine. Among these, as the nitrosamine compound, an N-nitroso-N-phenylhydroxylamine aluminum salt is preferable.

The hindered amine compound is a compound having a hindered amine structure in the molecule. Examples of the hindered amine compound include compounds described in JP1986-91257A (JP-S61-91257A). Among these, as the hindered amine compound, a derivative of 2,2,6,6-tetramethylpiperidine, which has a structure in which all hydrogens on carbons at 2- and 6-positions of piperidine are substituted with methyl groups, is preferable. Examples of the hindered amine compound include 4-benzoyloxy-2,2,6,6-tetramethylpiperidine and 1-(3,5-di-tert-butyl-4-hydroxyphenylpropionyloxyethyl)-4-(3,5-di-tert-butyl-4-hydroxyphenylpropionyloxy)-2,2,6,6-tetramethylpiperidine.

Examples of the hydroquinone compound include hydroquinone, methylhydroquinone, t-butylhydroquinone, and p-methoxyphenol. Among these, as the hydroquinone compound, p-methoxyphenol is preferable.

Examples of the nitroxyl radical include 2,2,6,6-tetramethylpiperidine-1-oxyl (TEMPO) and 2,2,6,6-tetramethyl-4-hydroxypiperidine-1-oxyl (TEMPOL). Among these, as the nitroxyl radical, 2,2,6,6-tetramethyl-4-hydroxypiperidine-1-oxyl (TEMPOL) is preferable.

From the viewpoint of improving the temporal stability of the ink, a content of the polymerization inhibitor is preferably 1% by mass or more and more preferably 1.5% by mass or more with respect to the total amount of the ink. The upper limit value of the content of the polymerization inhibitor is not particularly limited, but is preferably 5% by mass from the viewpoint of polymerization properties.

In a case where the polymerization inhibitor includes a nitrosamine compound, from the viewpoint of improving the temporal stability of the ink, a content of the nitrosamine compound is preferably 0.5% by mass to 5% by mass and more preferably 0.5% by mass to 2% by mass with respect to the total amount of the ink.

In a case where the polymerization inhibitor includes a hydroquinone compound, from the viewpoint of improving the temporal stability of the ink, a content of the hydroquinone compound is preferably 0.1% by mass to 5% by mass and more preferably 0.5% by mass to 2% by mass with respect to the total amount of the ink.

(Sensitizer)

In a case where the ink according to the embodiment of the present disclosure contains a polymerization initiator, the ink may contain a sensitizer together with the photopolymerization initiator. In a case where the ink contains a sensitizer, curing properties are improved, and particularly, the curing properties are improved in a case where an LED light source is used. In addition, the sensitizer also contributes to improvement of light resistance of the ink.

The sensitizer is a substance which is electronically excited by absorbing specific active energy rays. The electronically excited sensitizer comes into contact with the photopolymerization initiator and causes actions such as electron migration, energy transfer, and heat generation. As a result, chemical change of the photopolymerization initiator is facilitated.

Examples of the sensitizer include ethyl 4-(dimethylamino)benzoate (EDB), anthraquinone, a 3-acyl coumarin derivative, terphenyl, styryl ketone, 3-(aroylmethylene)thiazoline, succinoquinone, eosin, rhodamine, erythrosine, a compound represented by General Formula (i) described in JP2010-24276A, and a compound represented by General Formula (I) described in JP1994-107718A (JP-H6-107718A).

In a case where the ink contains a sensitizer, a content of the sensitizer is preferably 1.0% by mass to 15.0% by mass, more preferably 1.5% by mass to 10.0% by mass, and still more preferably 2.0% by mass to 6.0% by mass with respect to the total amount of the ink.

(Organic Solvent)

The ink according to the embodiment of the present disclosure may contain at least one organic solvent.

Examples of the organic solvent include ketones such as acetone, methyl ethyl ketone, and diethyl ketone; alcohols such as methanol, ethanol, 2-propanol, 1-propanol, 1-butanol, and tert-butanol; chlorine-based solvents such as chloroform and methylene chloride; aromatic solvents such as benzene and toluene; ester-based solvents such as ethyl acetate, butyl acetate, isopropyl acetate, ethyl lactate, butyl lactate, and isopropyl lactate; ether-based solvents such as diethyl ether, tetrahydrofuran, and dioxane; glycol ether-based solvents such as ethylene glycol monomethyl ether, ethylene glycol dimethyl ether, and propylene glycol monomethyl ether; and glycol ether acetate-based solvents such as propylene glycol monomethyl ether acetate.

In a case where the ink according to the embodiment of the present disclosure contains an organic solvent, a content of the organic solvent is preferably 5% by mass or less and more preferably 2% by mass or less with respect to the total amount of the ink. The ink according to the embodiment of the present disclosure may have a composition that does not contain an organic solvent (that is, the content of the organic solvent may be 0% by mass with respect to the total amount of the ink).

(Resin)

The ink according to the embodiment of the present disclosure preferably contains a resin.

In a case where the ink contains a resin, a near-infrared absorbing image having more excellent alcohol resistance is obtained.

The resin herein does not have an action of dispersing the near-infrared absorbing coloring agent (D) is distinguished from the above-described dispersant. In addition, the resin herein does not have a polymerizable group and is distinguished from the above-described polymerizable monomer (A).

Examples of the resin include an acrylic resin, a cellulose derivative, an epoxy resin, a polyester, a polyurethane, a polyamide, a polyvinyl chloride, a polyamide, a phenol resin, and a silicone resin.

Among these, as the resin, from the viewpoint of dispersion stability, an acrylic resin is preferable.

That is, the ink according to the embodiment of the present disclosure preferably contains an acrylic resin.

In the present disclosure, the "acrylic resin" refers to a polymer having a structural unit derived from a (meth) acrylic compound.

The (meth)acrylic compound is a compound having an acryloyl group ($CH_2{=}CH{-}C({=}O){-}$) or a methacryloyl group ($CH_2{=}C(CH_3){-}C({=}O){-}$).

Examples of the (meth)acrylic compound include (meth) acrylic acid, (meth)acrylic acid ester, and (meth)acrylamide.

The acrylic resin is preferably a polymer having a structural unit derived from (meth)acrylic acid ester, more preferably a polymer having a structural unit derived from methyl (meth)acrylate, and still more preferably poly(methyl (meth)acrylate).

From the viewpoint of improving the alcohol resistance of the near-infrared absorbing image, a content of the acrylic resin is preferably 0.5% by mass to 2% by mass with respect to the total amount of the ink.

From the viewpoint of improving the alcohol resistance of the near-infrared absorbing image, the content of the acrylic resin is preferably 0.40 parts by mass to 1.70 parts by mass in a case where the total amount of the polymerizable monomer (A) is 100 parts by mass.

From the viewpoint of jettability in a case where the ink is jetted by an ink jet recording system, a weight-average molecular weight of the resin is preferably 5,000 to 100,000 and more preferably 10,000 to 75,000.

From the viewpoint of jettability, a content of components having a molecular weight of 1,000 or more in the entire ink is preferably 6.5% by mass or less with respect to the total amount of the ink.

From the viewpoint of jettability, the lower limit of the content of components having a molecular weight of 1,000 or more in the entire ink is not particularly limited. The content of components having a molecular weight of 1,000 or more in the entire ink may be 0.5% by mass or more, 1.0% by mass or more, or 2.0% by mass or more.

The ink according to the embodiment of the present disclosure may further contain additives such as a surfactant other than a siloxane compound, an ultraviolet absorber, a co-sensitizer, an antioxidant, an antifading agent, and a conductive salt. For the additives, known publications such as JP2011-225848A and JP2009-209352A can be appropriately referred to.

<Physical Properties>

A viscosity of the ink according to the embodiment of the present disclosure is preferably 10 mPa·s to 50 mPa·s, more preferably 10 mPa·s to 30 mPa·s, and still more preferably 10 mPa·s to 25 mPa·s. The viscosity is a value measured at 25° C. using a viscometer.

The viscosity is measured, for example, using a VISCOMETER TV-22 type viscometer (manufactured by TOKISANGYO).

A surface tension of the ink according to the embodiment of the present disclosure is preferably 20 mN/m to 45 mN/m and more preferably 20 mN/m to 30 mN/m. The surface tension is a value measured at 25° C. using a surface tensiometer. The surface tension is measured, for example, using DY-700 (manufactured by Kyowa Interface Science Co., Ltd.).

[Ink Jet Recording Method]

The ink jet recording method according to the embodiment of the present disclosure includes a step of jetting the ink according to the embodiment of the present disclosure to a substrate by an ink jet recording system (hereinafter, also referred to as "ink jetting step") and a step of irradiating the ink jetted onto the substrate with an active energy ray (hereinafter, also referred to as "active energy ray-irradiating step").

(Ink Jetting Step)

In the ink jet recording method according to the embodiment of the present disclosure, first, the ink according to the embodiment of the present disclosure is jetted to a substrate by an ink jet recording system.

[Substrate]

The substrate is not particularly limited as long as an ink image can be formed thereon, and examples thereof include paper, cloth, wood, metals, and plastics.

Examples of the paper include general printing paper mainly composed of cellulose, such as high-quality paper, coated paper, and art paper, and ink jet recording paper. In addition, the paper may include an oil-based varnish or a water-based varnish applied thereon.

The substrate may be a permeable substrate or an impermeable substrate. The "impermeable" means that the substrate absorbs little or does not absorb water contained in the ink, which specifically means a property in which the amount of water absorbed by the substrate is 10.0 $g/m^2$ or less.

In the ink jet recording method according to the embodiment of the present disclosure, particularly, in a case where an impermeable substrate is used as the substrate, an image having excellent curing properties can be obtained.

A shape of the impermeable substrate is not particularly limited, and may be a three-dimensional shape such as a bottle, a sheet shape, or a film shape.

Examples of the impermeable substrate include metals (for example, aluminum), plastics (for example, polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinyl acetal), and glass.

Among these, it is preferable that the impermeable substrate includes a thermoplastic resin such as polyvinyl chloride, polyethylene terephthalate, and polypropylene.

The impermeable substrate may be surface-treated.

Examples of the surface treatment include a corona treatment, a plasma treatment, a flame treatment, a heat treatment, an abrasion treatment, and a light irradiation treatment (for example, an ultraviolet irradiation treatment).

The corona treatment can be performed, for example, using CORONA MASTER (PS-10S, manufactured by Shinko Electric & Instrumentation Co., Ltd.). Conditions for the corona treatment may be appropriately selected according to the type of the impermeable substrate, the composition of the ink, and the like. The corona treatment can be performed, for example, under the following conditions.

Treatment voltage: 10 to 15.6 kV

Treatment speed: 30 to 100 mm/s

In addition, the substrate may be a transparent substrate or a substrate processed by polyethylene or polypropylene lamination.

Examples of the transparent substrate include glass, quartz, and plastics (for example, cellulose diacetate, cellulose triacetate, cellulose propionate, cellulose butyrate, cellulose acetate butyrate, cellulose nitrate, an acrylic resin, a chlorinated polyolefin resin, a polyether sulfone resin, polyethylene terephthalate (PET), polyethylene naphthalate, nylon, polyethylene, polystyrene, polypropylene, a polycycloolefin resin, a polyimide resin, a polycarbonate resin, polyvinyl acetal, and the like). The transparent substrate may be composed of one layer or two or more layers.

[Ink Jet Recording System]

The ink jet recording system is not particularly limited as long as it is a system capable of recording an image. The ink jet recording system may be any of known systems, for example, an electric charge control system of jetting an ink by using electrostatic attraction force, a drop-on-demand system using the vibration pressure of a piezo element (pressure pulse system), an acoustic ink jet system of jetting an ink by using radiation pressure by means of converting electric signals into acoustic beams and irradiating the ink with the acoustic beams, and a thermal ink jet (Bubble Jet (registered trademark)) system of forming air bubbles by heating an ink and using the generated pressure.

As the ink jet recording system, particularly, it is possible to effectively use the method described in JP1979-59936A (JP-S54-59936A), which is an ink jet recording system of causing an ink to experience a rapid volume change by the action of thermal energy and jetting the ink from a nozzle by using the acting force resulting from the change of state.

Regarding the ink jet recording system, the method described in paragraphs 0093 to 0105 of JP2003-306623A can also be referred to.

Examples of an ink jet head used in the ink jet recording system include ink jet heads for a multi-pass system of using short serial heads which are caused to scan a substrate in a width direction of the substrate to perform recording, and ink jet heads for a single-pass system of using line heads which each consist of recording elements arranged for the entire area of each side of a substrate.

In the single-pass system, by causing the substrate to be scanned in a direction intersecting with the arrangement direction of the recording elements, a pattern can be formed on the entire surface of the substrate. Therefore, this system does not require a transport system such as a carriage which transports short heads for scanning. In addition, complicated scanning control for moving a carriage and a substrate is not necessary, and only the substrate moves. Therefore, the recording speed can be further increased in the single-pass system than in the multi-pass system. Accordingly, in the ink jet recording method according to the embodiment of the present disclosure, it is preferable that the ink is jetted by the single-pass system.

An amount of ink jetted from the ink jet head is preferably 1 pL (picoliter) to 100 pL, more preferably 3 pL to 80 pL, and still more preferably 3 pL to 20 pL.

(Active Energy Ray-Irradiating Step)

In the ink jet recording method according to the embodiment of the present disclosure, it is preferable that the ink jetted onto the substrate is irradiated with active energy rays. The polymerizable monomer in the ink is polymerized and cured by the irradiation with active energy rays. Examples of the active energy ray include α-rays, γ rays, X-rays, ultraviolet rays, visible rays, and electron beams. Among these, as the active energy rays, from the viewpoint of safety and cost, an ultraviolet ray (hereinafter, also referred to as "UV") or a visible ray is preferable, and an ultraviolet ray is more preferable.

An exposure amount of the active energy ray is preferably 20 $mJ/cm^2$ to 10,000 $J/cm^2$ and more preferably 100 $mJ/cm^2$ to 7.000 $mJ/cm^2$. An irradiation time is preferably 0.01 seconds to 120 seconds and more preferably 0.1 seconds to 90 seconds. As irradiation conditions and basic irradiation method, irradiation conditions and irradiation method described in JP1985-132767A (JP-S60-132767A) can be adopted. Specifically, it is preferable to use a system of providing a light source on both sides of a head unit including an ink jet device and scanning the substrate by the head unit and the light source by a so-called multi-pass system, or a system of irradiating the substrate with another light source which is not involved in driving.

As a light source for the ultraviolet irradiation, a mercury lamp, a gas laser, or a solid-state laser is mainly used, and a mercury lamp, a metal halide lamp, and an ultraviolet fluorescent lamp are widely known. In addition, using a gallium nitride (GaN)-based semiconductor ultraviolet light emitting device as a substitute is industrially and environmentally extremely useful. Furthermore, a UV light emitting diode (LED) and a UV laser diode (LD) are promising light sources for ultraviolet irradiation because these are compact, have long service life and high efficiency, and are inexpensive. Among these, a metal halide lamp, a high-pressure mercury lamp, a medium-pressure mercury lamp, a low-pressure mercury lamp, or UV-LED is preferable as the light source for the ultraviolet irradiation.

Examples of the UV-LED include a purple LED (manufactured by NICHIA CORPORATION) having a main emission spectrum at a wavelength between 365 nm and 420 nm. U.S. Pat. No. 6,084,250B describes, as LED having a shorter wavelength, LED which can emit an ultraviolet ray having a wavelength between 300 nm and 370 nm.

In addition, by combining several UV-LEDs, it is possible to radiate ultraviolet rays in different wavelength ranges. A peak wavelength of the ultraviolet ray is, for example, preferably 200 nm to 405 nm, more preferably 220 nm to 400 nm, and still more preferably 340 nm to 400 nm.

In a case where the active energy ray irradiation is performed in an atmosphere with an oxygen concentration of 1% by volume or less after the ink jetting step, it is possible to inhibit oxygen from hindering polymerization and to improve curing properties. The lower limit value of the oxygen concentration is not particularly limited. By making a vacuum state or substituting the irradiation atmosphere with a gas (for example, nitrogen) other than the air, it is possible to make the oxygen concentration substantially 0. The oxygen concentration in the active energy ray-irradiating step is preferably 0.01% by volume to 1% by volume and more preferably 0.1% by volume to 1% by volume.

Examples of a method for controlling the oxygen concentration of the irradiation atmosphere include a method of forming the ink jet recording device into a closed system and making it into a nitrogen atmosphere or a carbon dioxide atmosphere, and a method of flowing an inert gas such as nitrogen. Examples of a nitrogen supplying method include a method of using a nitrogen gas cylinder, and a method of using a device separating only a nitrogen gas from the air by exploiting the difference between permeability of oxygen to a hollow fiber membrane and permeability of nitrogen to a hollow fiber membrane. Examples of a carbon dioxide supplying method include a method of using a carbon dioxide gas cylinder. The inert gas refers to a general gas such as $N_2$, $H_2$, or $CO_2$, and a rare gas such as He, Ne, or Ar. Among these, from the viewpoint of safety, ease of availability, and cost, $N_2$ is preferable as the inert gas.

In addition, the active energy ray-irradiating step may include a step of irradiating the ink jetted onto the substrate with a first active energy ray to semi-cure the ink film (that is, the film formed of the ink applied onto the substrate) (hereinafter, this step will be referred to as "first irradiating step"), and a step of irradiating the semi-cured ink film with a second active energy ray to main-cure the ink film (hereinafter, this step will be referred to as "second irradiating step").

In a case where the step of semi-curing the ink film is performed and then the step of main-curing the ink film is performed, the readability after a rub test and readability after an adhesion test are improved.

In the present disclosure, polymerization of only some of the polymerizable monomer in the ink film is referred to as "semi-curing", and the active energy ray irradiation for semi-curing is also referred to as "pinning exposure". In addition, in the present disclosure, polymerization of substantially all the polymerizable monomers in the ink film is referred to as "main-curing", and the active energy ray irradiation for main-curing is also referred to as "main exposure".

In the first irradiating step, by the irradiation of the ink film with the first active energy ray, at least some of the polymerizable monomers in the ink film are polymerized. In the second irradiating step, by the irradiation of the ink film with the second active energy ray, substantially all of the polymerizable monomers in the ink film are polymerized.

In the first irradiating step, in order to polymerize only some of the polymerizable monomers in the ink film, an exposure amount of the active energy ray is set to be smaller, compared to a case where only the main exposure is performed.

The exposure amount of the first active energy ray is preferably 2 $mJ/cm^2$ to 5,000 $mJ/cm^2$ and more preferably 20 $mJ/cm^2$ to 5,000 $mJ/cm^2$. An irradiation time is preferably 0.01 seconds to 20 seconds and more preferably 0.1 seconds to 10 seconds.

An exposure amount of the second active energy ray is preferably 20 $mJ/cm^2$ to 10,000 $J/cm^2$ and more preferably 100 $mJ/cm^2$ to 7,000 $mJ/cm^2$.

An irradiation time is preferably 0.01 seconds to 120 seconds and more preferably 0.1 seconds to 90 seconds.

A reaction rate of the ink film after the pinning exposure is preferably 10% to 80%.

A reaction rate of the ink film after the main exposure is preferably more than 80% and 100% or less, more preferably 85% to 100%, and still more preferably 90% to 100%.

The reaction rate of the ink film means a polymerization rate of the polymerizable monomer in the ink film, determined by high-performance liquid chromatography.

The reaction rate of the ink film is calculated by the following method.

A substrate having an ink film irradiated with an active energy ray is prepared. A sample piece having a size of 20 mm×50 mm is cut out from a region of the substrate where the ink film is present. The cut sample piece is immersed in 10 mL of tetrahydrofuran (THF) for 24 hours, thereby obtaining an eluate containing the eluted ink. High-performance liquid chromatography is performed on the obtained eluate to calculate the amount of the polymerizable monomer (hereinafter, referred to as "amount $X^1$ of monomers after irradiation").

The same operation as described above is separately performed, except that another substrate having an ink film not being irradiated with an active energy ray is prepared, and the amount of polymerizable monomer (hereinafter, referred to as "amount $X^0$ of monomers before irradiation") is calculated.

Based on the amount $X^1$ of monomer after irradiation and the amount $X^0$ of monomers before irradiation, the reaction rate (%) of the ink film is calculated by the following expression.

$$\text{Reaction rate of ink (\%)}=((\text{amount } X^0 \text{ of monomers before irradiation}-\text{amount } X^1 \text{ of monomers after irradiation})/\text{amount } X^0 \text{ of monomers before irradiation})\times 100$$

In a case where the active energy ray-irradiating step includes the first irradiating step and the second irradiating step, the time taken for the ink to be irradiated with the first active energy ray after being landed on the substrate is preferably within 0.5 seconds. In a case where the ink is semi-cured immediately after landing, the ink is inhibited from spreading on the substrate, and the readability is improved. There is no particular limit on the time taken for the ink to be irradiated with the second active energy ray after being landed on the substrate.

In a case where the semi-curing step is not included (that is, only the main-curing step is performed), the time taken for the ink to be irradiated with an active energy ray after being landed on the substrate is preferably within 1 second. In a case where the ink is main-cured immediately after landing, the ink is inhibited from spreading on the substrate, and the readability is improved.

(Other Steps)

The ink jet recording method according to the embodiment of the present disclosure may include other steps in addition to the ink jetting step and the active energy ray-irradiating step. Examples of the other steps include a drying step of drying the ink jetted onto the substrate after the ink jetting step. A drying unit and a drying temperature in the drying step can be appropriately adjusted.

EXAMPLES

Hereinafter, Examples according to the present disclosure will be described, but the present disclosure is not limited to Examples below.

Details of each component contained in inks of Examples and Comparative Examples are as follows.

Speedcure 7010L (manufactured by Lambson) and FLORSTAB UV12 (manufactured by Kromachem Ltd) were used for preparing the inks. Speedcure 7010L is a mixture of Speedcure 7010 and EOTMPTA, and the mixing ratio thereof is 1:1 on a mass basis. In the tables, Speedcure 7010 is described in the column of "Polymerization initiator", and EOTMPTA is described in the column of "Polymerizable monomer".

In addition, FLORSTAB UV12 is a mixture of a N-nitroso-N-phenylhydroxylamine aluminum salt and PEA, and the mixing ratio thereof is 1:9. In the tables, the N-nitroso-N-phenylhydroxylamine aluminum salt is described in the column of "Polymerization inhibitor", and PEA is described in the column of "Polymerizable monomer".

Examples 1 to 22 and Comparative Examples 1 and 2

Inks having compositions shown in Tables 1 to 3 were prepared.

The ink was prepared by preparing a dispersion liquid containing a near-infrared absorbing coloring agent, a dispersant, a pigment derivative, and a polymerizable monomer, and mixing the obtained dispersion liquid with other components.

Details of each component in the ink are as follows.

<Near-Infrared Absorbing Coloring Agent (D)>

A compound S-1, a compound S-3, and a compound S-7, which were squarylium coloring agents, are as described above as the specific examples of the squarylium coloring agent represented by Formula 1 or Formula 2.

As a perylene coloring agent, "Lumogen IR788" from BASF SE was used.

As a phthalocyanine coloring agent, for example, "EXCOLOR IR-14" manufactured by Nippon Shokubai Co., Ltd. was used.

A cyanine 1 which was a cyanine coloring agent and a compound (A-1) which was a pyrrolopyrrole coloring agent were coloring agent compounds having the following structure, respectively.

Cyanine 1

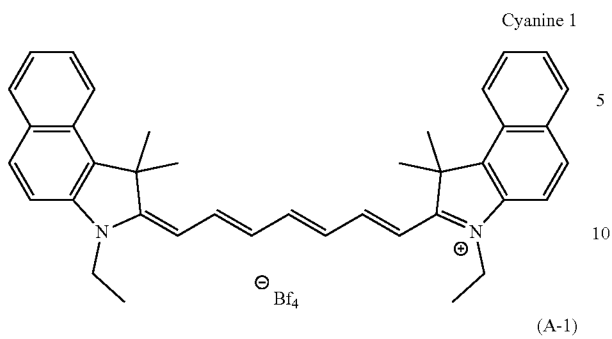

(A-1)

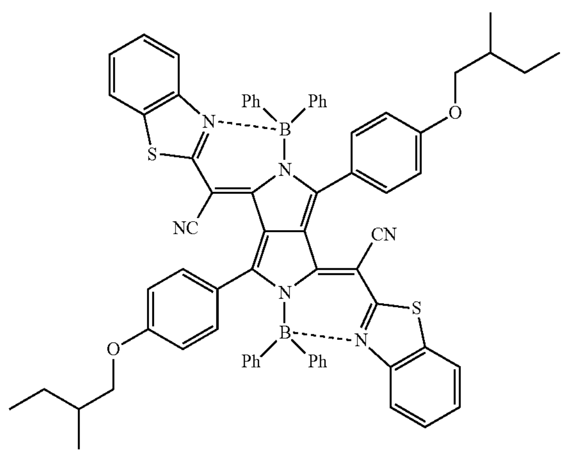

<Pigment Derivative>

SOLSPERSE 12000S . . . manufactured by Lubrizol Japan Limited; a copper phthalocyanine-based synergist having a sulfo group.

<Dispersant>

SOLSPERSE 71000 . . . manufactured by Lubrizol Japan Limited; a graft polymer having a basic functional group; weight-average molecular weight: 52,890, SP value: 21.74 $MPa^{1/2}$.

<Siloxane Compound (C)>

TEGORAD 2200N, 2250, 2300, 2010 . . . all manufactured by Evonik Industries AG; siloxane compound (CA) represented by Formula CA, in Formula CA, x, y, m, and n are shown in Tables 1 to 3, in all of the compounds, Rp in Formula CA is an acryloyl group.

BYKUV-3500 . . . manufactured by BYK Chemie Japan; siloxane compound (CA) represented by Formula CA, in Formula CA, x, y, m, and n are shown in Tables 1 to 3, in Formula CA, Rp is an acryloyl group.

TEGORAD 2500 . . . manufactured by Evonik Industries AG; comparative siloxane compound in which a ratio of the specific AO unit is less than 30% by mole, in Formula CA, x, y, m, and n are shown in Tables 1 to 3, in Formula CA, Rp is an acryloyl group.

<Polymerizable Monomer (A)>

MPDDA . . . trade name "SR341" (manufactured by Sartomer), 3-methyl-1,5-pentanediol diacrylate; SP value: 17.60 $MPa^{1/2}$, Tg: 105° C.

DPGDA . . . trade name "DPGDA" (manufactured by DAICEL-ALLNEX LTD.), dipropylene glycol diacrylate; SP value: 17.73 MPa/2, Tg: 104° C.

IBOA . . . trade name "SR506NS" (manufactured by Sartomer), isobornyl acrylate; SP value: 17.10 $MPa^{1/2}$, Tg: 97° C.

TCDDMDA . . . trade name "SR833S" (manufactured by Sartomer), tricyclodecanedimethanol diacrylate; SP value: 17.85 $MPa^{1/2}$. Tg: 186° C.

EOTMPTA . . . trimethylolpropane EO-added triacrylate; SP value: 17.72 $MPa^{1/2}$, Tg: 90° C.

PEA . . . phenoxyethyl acrylate; SP value: 19.44 $MPa^{1/2}$, taking up 90% by mass of FLORSTAB UV12 (manufactured by Kromachem Ltd), Tg: 5° C.

CTFA . . . cyclic trimethylolpropane formal acrylate; SP value: 19.0 $MPa^{1/2}$, Tg: 33.2° C.

4-HBA . . . 4-hydroxybutyl acrylate; SP value: 21.0 $MPa^{1/2}$, Tg: −32° C.

As a glass transition temperature (Tg) of each polymerizable monomer, Tg in which each polymerizable monomer was in a state of being a homopolymer having a weight-average molecular weight of 10,000 to 20,000 was adopted. The glass transition temperature (Tg) was a value measured using a differential scanning calorimeter (trade name "EXSTAR6220") manufactured by SII Nano Technology Inc.

The SP value of the polymerizable monomer was calculated based on the expression S and expressions F1 to F3 described above. The dispersion element δd, the polarity element δp, and the hydrogen bond element δh of each polymerizable monomer contained in the ink were as described in Tables 1 to 3, and were values calculated using HSPiP (version 4.1.07) software.

<Polymerization Initiator (B)>

Omnirad 819 . . . manufactured by IGM Resins B.V; bis(2,4,6-trimethylbenzoyl)-phenylphosphine oxide.

Omnirad TPO-L . . . manufactured by IGM Resins B.V.; (2,4,6-trimethylbenzoyl)ethoxyphenylphosphine oxide.

<Sensitizer>

Speedcure 7010 . . . manufactured by Lambson; 1,3-di({α-[1-chloro-9-oxo-9H-thioxanthen-4-yl)oxy]acetylpoly[oxy(1-methylethylene)]}oxy)-2,2-bis({α-[1-methylethylene)]}oxymethyl)propane.

<Polymerization Inhibitor>

UV-12 . . . N-nitroso-N-phenylhydroxylamine aluminum salt, taking up 10% by mass of FLORSTAB UV12 (manufactured by Kromachem Ltd)

<Image Recording>

The prepared ink was filtered using a 5 m filter.

An ink cartridge attached to an ink jet recording device (trade name "DMP-2850", manufactured by FUJIFILM Corporation) was filled with the filtrate, and a 3% halftone dot image was recorded on a substrate under conditions of a nozzle temperature of 25° C., a resolution of 600 dpi (dots per inch), and a jetting amount of 10 pL.

A polyethylene terephthalate (PET) film was used as the substrate. Thereafter, by using an LED lamp (trade name "PEL UV CURE UNIT", manufactured by PRINTED ELECTRONICS LTD), the substrate was irradiated with ultraviolet rays (wavelength of 395 nm) in an exposure amount of 250 $mW/cm^2$, thereby obtaining an article with a recorded image.

<Evaluation>

(Alcohol Resistance of Image)

The obtained image was evaluated for alcohol resistance. The results thereof are shown in Tables 1 to 3.

The image in the article with a recorded image, obtained by the above-described image recording, was rubbed with a cotton swab to which a 75% by mass ethanol aqueous solution had been applied with a constant force. Twenty sites were randomly selected from the image of the rubbing operation, and whether or not the image was readable was determined using an IR detector.

Based on the number of sites where the image was readable, readability was evaluated. The evaluation standard was as follows. A rank of the most excellent alcohol resistance is AAA.

AAA: the image was read at 18 to 20 sites.

AA: the image was read at 15 to 17 sites.

A: the image was read at 10 to 14 sites.

B: the image was read at 5 to 9 sites.

C: the image was read at 1 to 4 sites.

D: the image was not readable.

(Readability of Image)

In addition, using an infrared (IR) detector, it was determined whether or not the image in the obtained article with a recorded image had IR readability as a readable performance.

As a result, the image in the article with a recorded image of each of Examples and Comparative Examples had IR readability.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Near-infrared absorbing coloring agent (D) | Squarylium coloring agent | Compound S-3 | — | — | — | — | — | — | — | — | — |
| | | Compound S-1 | — | — | — | — | — | — | — | — | — |
| | | Compound S-7 | — | — | — | — | — | — | — | — | — |
| | Cyanine coloring agent | Cyanine 1 | 1 | 1 | — | — | — | 1 | 1 | 1 | 1 |
| | Perylene coloring agent | Lumogen IR 788 | — | — | 1 | — | — | — | — | — | — |
| | Phthalocyanine coloring agent | EXCOLOR IR-14 | — | — | — | 1 | — | — | — | — | — |
| | Pyrrolopyrrole coloring agent | Compound (A-1) | — | — | — | — | 1 | — | — | — | — |
| Pigment derivative | Copper phthalocyanine-based synergist | SOLSPERSE 12000S | — | — | — | — | — | — | — | — | — |
| Dispersant | Basic dispersant | SOLSPERSE 71000 | — | — | — | — | — | — | — | — | — |
| Siloxane compound (C) | Having 30% by mole or more of specific AO unit | TEGORAD 2200N | 0.3 | 3.2 | 0.3 | 0.3 | 0.3 | — | — | — | — |
| | | BYKUV-3500 | — | — | — | — | — | 0.3 | — | — | — |
| | | TEGORAD 2250 | — | — | — | — | — | — | 0.3 | — | — |
| | | TEGORAD 2300 | — | — | — | — | — | — | — | 0.3 | — |
| | | TEGORAD 2010 | — | — | — | — | — | — | — | — | 0.3 |
| | Having less than 30% by mole of specific AO unit (for comparison) | TEGORAD 2500 | — | — | — | — | — | — | — | — | — |
| Polymerizable monomer (A) | Difunctional monomer | MPDDA | 3 | 3 | 3 | 3 | 3 | 3 | 3 | 3 | 3 |
| | Difunctional monomer | DPGDA | 0 | 0 | 0 | 0 | 0 | 0 | 0 | 0 | 0 |
| | Monofuctional monomer/viscosity adjustment/ high Tg | IBOA | 19.7 | 16.8 | 19.7 | 19.7 | 19.7 | 19.7 | 19.7 | 19.7 | 19.7 |
| | Difunctional monomer | TCDDMDA | 13 | 13 | 13 | 13 | 13 | 13 | 13 | 13 | 13 |
| | Trifunctional monomer | EOTMPTA | 9 | 9 | 9 | 9 | 9 | 9 | 9 | 9 | 9 |
| | Monofuctional monomer | PEA | 1.8 | 1.8 | 1.8 | 1.8 | 1.8 | 1.8 | 1.8 | 1.8 | 1.8 |
| | Monofuctional monomer/ high SP value | CTFA | 40 | 40 | 40 | 40 | 40 | 40 | 40 | 40 | 40 |
| | Monofuctional monomer/ high SP value | 4-HBA | 0 | 0 | 0 | 0 | 0 | 0 | 0 | 0 | 0 |
| Polymerization initiator (B) | Acylphosphine-based initiator | Omnirad 819 | 4 | 4 | 4 | 4 | 4 | 4 | 4 | 4 | 4 |
| | | Omnirad TPO-L | 6 | 6 | 6 | 6 | 6 | 6 | 6 | 6 | 6 |
| Sensitizer | Thioxanthone-based sensitizer | Speedcure 7010 | 2 | 2 | 2 | 2 | 2 | 2 | 2 | 2 | 2 |
| Polymerization inhibitor | Nitrosamine-based polymerization inhibitor | UV-12 | 0.2 | 0.2 | 0.2 | 0.2 | 0.2 | 0.2 | 0.2 | 0.2 | 0.2 |
| | Total (part by mass) | | 100.0 | 100.0 | 100.0 | 100.0 | 100.0 | 100.0 | 100.0 | 100.0 | 100.0 |
| Detail of siloxane compound (C) | x (molar ratio of Si—O unit (with side chain)) | | 1.0 | 1.0 | 1.0 | 1.0 | 1.0 | 1.0 | 1.0 | 1.0 | 1.0 |
| | y (molar ratio of Si—O unit (without side chain)) | | 7.0 | 7.0 | 7.0 | 7.0 | 7.0 | 12.6 | 11.9 | 11.0 | 10.0 |
| | m (molar ratio of EO unit) | | 17.0 | 17.0 | 17.0 | 17.0 | 17.0 | 19.6 | 18.6 | 12.6 | 11.0 |
| | n (molar ratio of PO unit) | | 5.0 | 5.0 | 5.0 | 5.0 | 5.0 | 6.3 | 5.9 | 0.1 | 0.0 |
| | (m + n)/(x + y + m + n)*100 | | 73.3 | 73.3 | 73.3 | 73.3 | 73.3 | 65.6 | 65.5 | 51.5 | 50.0 |

TABLE 1-continued

| | | Example 1 | Example 2 | Example 3 | Example 4 | Example 5 | Example 6 | Example 7 | Example 8 | Example 9 |
|---|---|---|---|---|---|---|---|---|---|---|
| Mass ratio [polymerizable monomer (A)/ siloxane compound (C)] | | 288.3 | 26.1 | 288.3 | 288.3 | 288.3 | 288.3 | 288.3 | 288.3 | 288.3 |
| Proportion of polymerizable monomer (A) in entire ink [% by mass] | | 86.5 | 83.6 | 86.5 | 86.5 | 86.5 | 86.5 | 86.5 | 86.5 | 86.5 |
| Proportion of monofunctional monomer in entire polymerizable monomer (A) [% by mass] | | 71.1 | 70.1 | 71.1 | 71.1 | 71.1 | 71.1 | 71.1 | 71.1 | 71.1 |
| Proportion of component having molecular weight of 1000 or more in entire ink [% by mass] | | 2.3 | 5.2 | 2.3 | 2.3 | 2.3 | 2.3 | 2.3 | 2.3 | 2.3 |
| SP value calculation of polymerizable monomer (A) | δd | 16.9 | 16.9 | 16.9 | 16.9 | 16.9 | 16.9 | 16.9 | 16.9 | 16.9 |
| | δp | 4.3 | 4.3 | 4.3 | 4.3 | 4.3 | 4.3 | 4.3 | 4.3 | 4.3 |
| | δh | 4.8 | 4.9 | 4.8 | 4.8 | 4.8 | 4.8 | 4.8 | 4.8 | 4.8 |
| | SP value | 18.1 | 18.1 | 18.1 | 18.1 | 18.1 | 18.1 | 18.1 | 18.1 | 18.1 |
| Evaluation result | Alcohol resistance | C | C | C | C | C | C | C | C | C |

TABLE 2

| | | | Example 10 | Example 11 | Example 12 | Example 13 | Example 14 | Example 15 | Example 16 | Example 17 | Example 18 |
|---|---|---|---|---|---|---|---|---|---|---|---|
| Near-infrared absorbing coloring agent (D) | Squarylium coloring agent | Compound S-3 | — | — | — | — | — | — | — | — | 1 |
| | | Compound S-1 | — | — | — | — | — | — | — | — | — |
| | | Compound S-7 | — | — | — | — | — | — | — | — | — |
| | Cyanine coloring agent | Cyanine 1 | 1 | 1 | 1 | 1 | 1 | 1 | 1 | 1 | — |
| | Perylene coloring agent | Lumogen IR 788 | — | — | — | — | — | — | — | — | — |
| | Phthalocyanine coloring agent | EXCOLOR IR-14 | — | — | — | — | — | — | — | — | — |
| | Pyrrolopyrrole coloring agent | Compound (A-1) | — | — | — | — | — | — | — | — | — |
| Pigment derivative | Copper phthalocyanine-based synergist | SOLSPERSE 12000S | — | — | — | — | — | — | — | — | — |
| Dispersant | Basic dispersant | SOLSPERSE 71000 | — | — | — | — | — | — | — | — | — |
| Siloxane compound (C) | Having 30% by mole or more of specific AO unit | TEGORAD 2200N | 0.3 | 0.5 | 1.0 | 3.0 | 1.0 | 1.0 | 1.0 | 1.0 | 1.0 |
| | | BYKUV-3500 | — | — | — | — | — | — | — | — | — |
| | | TEGORAD 2250 | — | — | — | — | — | — | — | — | — |
| | | TEGORAD 2300 | — | — | — | — | — | — | — | — | — |
| | | TEGORAD 2010 | — | — | — | — | — | — | — | — | — |
| | Having less than 30% by mole of specific AO unit (for comparison) | TEGORAD 2500 | — | — | — | — | — | — | — | — | — |
| Polymerizable monomer (A) | Difunctional monomer | MPDDA | 3 | 3 | 3 | 3 | 3 | 3 | 15 | 24 | 24 |
| | Difunctional monomer | DPGDA | 0 | 0 | 0 | 0 | 0 | 19 | 25 | 25 | 25 |
| | Monofuctional monomer/viscosity adjustment/ high Tg | IBOA | 25.7 | 25.5 | 25 | 23 | 41 | 40 | 22 | 15 | 15 |
| | Difunctional monomer | TCDDMDA | 13 | 13 | 13 | 13 | 13 | 13 | 13 | 13 | 13 |
| | Trifunctional monomer | EOTMPTA | 9 | 9 | 9 | 9 | 9 | 9 | 9 | 7 | 7 |
| | Monofuctional monomer | PEA | 1.8 | 1.8 | 1.8 | 1.8 | 1.8 | 1.8 | 1.8 | 1.8 | 1.8 |
| | Monofuctional monomer/high SP value | CTFA | 34 | 34 | 34 | 34 | 18 | 0 | 0 | 0 | 0 |
| | Monofuctional monomer/high SP value | 4-HBA | 0 | 0 | 0 | 0 | 0 | 0 | 0 | 0 | 0 |
| Polymerization initiator (B) | Acylphosphine-based initiator | Omnirad 819 | 4 | 4 | 4 | 4 | 4 | 4 | 4 | 4 | 4 |
| | | Omnirad TPO-L | 6 | 6 | 6 | 6 | 6 | 6 | 6 | 6 | 6 |
| Sensitizer | Thioxanthone-based sensitizer | Speedcure 7010 | 2 | 2 | 2 | 2 | 2 | 2 | 2 | 2 | 2 |
| Polymerization inhibitor | Nitrosamine-based | UV-12 | 0.2 | 0.2 | 0.2 | 0.2 | 0.2 | 0.2 | 0.2 | 0.2 | 0.2 |

TABLE 2-continued

| | | Example 10 | Example 11 | Example 12 | Example 13 | Example 14 | Example 15 | Example 16 | Example 17 | Example 18 |
|---|---|---|---|---|---|---|---|---|---|---|
| | polymerization inhibitor | | | | | | | | | |
| | Total (part by mass) | 100.0 | 100.0 | 100.0 | 100.0 | 100.0 | 100.0 | 100.0 | 100.0 | 100.0 |
| Detail of siloxane compound (C) | x (molar ratio of Si—O unit (with side chain)) | 1.0 | 1.0 | 1.0 | 1.0 | 1.0 | 1.0 | 1.0 | 1.0 | 1.0 |
| | y (molar ratio of Si—O unit (without side chain)) | 7.0 | 7.0 | 7.0 | 7.0 | 7.0 | 7.0 | 7.0 | 7.0 | 7.0 |
| | m (molar ratio of EO unit) | 17.0 | 17.0 | 17.0 | 17.0 | 17.0 | 17.0 | 17.0 | 17.0 | 17.0 |
| | n (molar ratio of PO unit) | 5.0 | 5.0 | 5.0 | 5.0 | 5.0 | 5.0 | 5.0 | 5.0 | 5.0 |
| | (m + n)/(x + y + m + n)*100 | 73.3 | 73.3 | 73.3 | 73.3 | 73.3 | 73.3 | 73.3 | 73.3 | 73.3 |
| | Mass ratio [polymerizable monomer (A)/siloxane compound (C)] | 288.3 | 172.6 | 85.8 | 27.9 | 85.8 | 85.8 | 85.8 | 85.8 | 85.8 |
| | Proportion of polymerizable monomer (A) in entire ink [% by mass] | 86.5 | 86.3 | 85.8 | 83.8 | 85.8 | 85.8 | 85.8 | 85.8 | 85.8 |
| | Proportion of monofunctional monomer in entire polymerizable monomer (A) [% by mass] | 71.1 | 71.0 | 70.9 | 70.2 | 70.9 | 48.7 | 27.7 | 19.6 | 19.6 |
| | Proportion of component having molecular weight of 1000 or more in entire ink [% by mass] | 2.3 | 2.5 | 3.0 | 5.0 | 3.0 | 3.0 | 3.0 | 3.0 | 3.0 |
| SP value calculation of polymerizable monomer (A) | δd | 16.9 | 16.9 | 16.9 | 16.9 | 16.8 | 16.7 | 16.6 | 16.6 | 16.6 |
| | δp | 4.0 | 4.0 | 4.0 | 4.1 | 3.4 | 3.0 | 3.3 | 3.4 | 3.4 |
| | δh | 4.6 | 4.6 | 4.6 | 4.7 | 4.1 | 4.0 | 4.6 | 4.8 | 4.8 |
| | SP value | 18.0 | 18.0 | 18.0 | 18.0 | 17.6 | 17.4 | 17.5 | 17.6 | 17.6 |
| Evaluation result | Alcohol resistance | B | A | A | A | AA | AAA | AAA | AAA | AAA |

TABLE 3

| | | | Example 19 | Example 20 | Example 21 | Example 22 | Comparative Example 1 | Comparative Example 2 |
|---|---|---|---|---|---|---|---|---|
| Near-infrared absorbing coloring agent (D) | Squarylium coloring agent | Compound S-3 | 1 | 1 | — | — | 1 | 1 |
| | | Compound S-1 | — | — | 1 | — | | |
| | | Compound S-7 | — | — | — | 1 | | |
| | Cyanine coloring agent | Cyanine 1 | — | — | — | — | — | — |
| | Perylene coloring agent | Lumogen IR 788 | — | — | — | — | — | — |
| | Phthalocyanine coloring agent | EXCOLOR IR-14 | — | — | — | — | — | — |
| | Pyrrolopyrrole coloring agent | Compound (A-1) | — | — | — | — | — | — |
| Pigment derivative | Copper phthalocyanine-based synergist | SOLSPERSE 12000S | — | 0.005 | 0.005 | 0.005 | 0.005 | 0.005 |
| Dispersant | Basic dispersant | SOLSPERSE 71000 | 1 | 1 | 1 | 1 | 1 | 1 |
| Siloxane compound (C) | Having 30% by mole or more of specific AO unit | TEGORAD 2200N | 1.0 | 1.0 | 1.0 | 1.0 | — | — |
| | | BYKUV-3500 | — | — | — | — | — | — |
| | | TEGORAD 2250 | — | — | — | — | — | — |
| | | TEGORAD 2300 | — | — | — | — | — | — |
| | | TEGORAD 2010 | — | — | — | — | — | — |
| | Having less than 30% by mole of specific AO unit (for comparison) | TEGORAD 2500 | — | — | — | — | — | 1.0 |
| Polymerizable monomer (A) | Difunctional monomer | MPDDA | 24 | 24 | 24 | 24 | 25 | 24 |
| | Difunctional monomer | DPGDA | 25 | 25 | 25 | 25 | 25 | 25 |
| | Monofuctional monomer/viscosity adjustment/high Tg | IBOA | 14 | 14 | 14 | 14 | 14 | 14 |
| | Difunctional monomer | TCDDMDA | 13 | 13 | 13 | 13 | 13 | 13 |
| | Trifunctional monomer | EOTMPTA | 7 | 7 | 7 | 7 | 7 | 7 |
| | Monofuctional monomer | PEA | 1.8 | 1.8 | 1.8 | 1.8 | 1.8 | 1.8 |

TABLE 3-continued

| | | | Example 19 | Example 20 | Example 21 | Example 22 | Comparative Example 1 | Comparative Example 2 |
|---|---|---|---|---|---|---|---|---|
| | Monofuctional monomer/high SP value | CTFA | 0 | 0 | 0 | 0 | 0 | 0 |
| | Monofuctional monomer/high SP value | 4-HBA | 0 | 0 | 0 | 0 | 0 | 0 |
| Polymerization initiator (B) | Acylphosphine-based initiator | Omnirad 819 | 4 | 4 | 4 | 4 | 4 | 4 |
| | | Omnirad TPO-L | 6 | 6 | 6 | 6 | 6 | 6 |
| Sensitizer | Thioxanthone-based sensitizer | Speedcure 7010 | 2 | 2 | 2 | 2 | 2 | 2 |
| Polymerization inhibitor | Nitrosamine-based polymerization inhibitor | UV-12 | 0.2 | 0.2 | 0.2 | 0.2 | 0.2 | 0.2 |
| | Total (part by mass) | | 100.0 | 100.0 | 100.0 | 100.0 | 100.0 | 100.0 |
| Detail of siloxane compound (C) | x (molar ratio of Si—O unit (with side chain)) | | 1.0 | 1.0 | 1.0 | 1.0 | — | 1.0 |
| | y (molar ratio of Si—O unit (without side chain)) | | 7.0 | 7.0 | 7.0 | 7.0 | — | 8.7 |
| | m (molar ratio of EO unit) | | 17.0 | 17.0 | 17.0 | 17.0 | — | 1.1 |
| | n (molar ratio of PO unit) | | 5.0 | 5.0 | 5.0 | 5.0 | — | 0.0 |
| | (m + n)/(x + y + m + n)*100 | | 73.3 | 73.3 | 73.3 | 73.3 | — | 10.1 |
| Mass ratio [polymerizable monomer (A)/ siloxane compound (C)] | | | 84.8 | 84.8 | 84.8 | 84.8 | — | — |
| Proportion of polymerizable monomer (A) in entire ink [% by mass] | | | 84.8 | 84.8 | 84.8 | 84.8 | 85.8 | 84.8 |
| Proportion of monofunctional monomer in entire polymerizable monomer (A) [% by mass] | | | 18.6 | 18.6 | 18.6 | 18.6 | 18.4 | 18.6 |
| Proportion of component having molecular weight of 1000 or more in entire ink [% by mass] | | | 4.0 | 4.0 | 4.0 | 4.0 | 3.0 | 4.0 |
| SP value calculation of polymerizable monomer (A) | δd | | 16.6 | 16.6 | 16.6 | 16.6 | 16.6 | 16.6 |
| | δp | | 3.4 | 3.4 | 3.4 | 3.4 | 3.4 | 3.4 |
| | δh | | 4.8 | 4.8 | 4.8 | 4.8 | 4.8 | 4.8 |
| | SP value | | 17.6 | 17.6 | 17.6 | 17.6 | 17.6 | 17.6 |
| Evaluation result | Alcohol resistance | | AAA | AAA | AAA | AAA | D | D |

As shown in Table 1, in the ink of each of Examples, which contained the polymerizable monomer (A), the polymerization initiator (B), the siloxane compound (C) in which the proportion of the specific AO unit (that is, the proportion of the total number of moles of the ethyleneoxy unit and the propyleneoxy unit with respect to the total number of moles of the structural unit having an Si—O bond, the ethyleneoxy unit, and the propyleneoxy unit) was 30% by mole or more, and the near-infrared absorbing coloring agent (D), the alcohol resistance of the recorded image was excellent.

In Comparative Example 1 in which the ink not containing the siloxane compound was used and in Comparative Example 2 in which the ink containing, instead of the siloxane compound (C), the comparative siloxane compound in which the proportion of the specific AO unit was less than 30% by mol was used, the alcohol resistance of the recorded image was deteriorated as compared with each of Examples.

From the results of all Examples, it was found that, from the viewpoint of further improving the alcohol resistance of the image, the SP value of the polymerizable monomer (A) was preferably 18.0 $MPa^{1/2}$ or less.

From the results of Example 2 and Example 13, it was found that, from the viewpoint of further improving the alcohol resistance of the image, the content of the siloxane compound (C) was preferably 3.0% by mass or less with respect to the total amount of the ink.

From the results of Example 10 and Example 11, it was found that, from the viewpoint of further improving the alcohol resistance of the image, the content of the siloxane compound (C) was preferably 0.5% by mass or more with respect to the total amount of the ink.

From the results of Examples 14 to 17, it was found that, from the viewpoint of further improving the alcohol resistance of the image, the proportion of the monofunctional polymerizable monomer in the polymerizable monomer (A) was preferably 50% by mass or less.

Examples A to E

Inks having compositions shown in Table 4 were prepared.

The ink was prepared by preparing a dispersion liquid containing a near-infrared absorbing coloring agent, a dispersant, a pigment derivative, and a polymerizable monomer, and mixing the obtained dispersion liquid with other components.

Details of each component in the ink are as shown in the description of Examples 1 to 22.

In the inks of Examples A to E, the following acrylic resins were further used.

<Acrylic Resin>

Acrylic resin . . . trade name "DIANAL BR-113", manufactured by Mitsubishi Chemical Corporation; poly (methyl methacrylate); weight-average molecular weight (Mw): 30,000

Acrylic resin . . . trade name "DIANAL BR-110", manufactured by Mitsubishi Chemical Corporation; poly (methyl methacrylate); weight-average molecular weight (Mw): 72,000

Acrylic resin . . . trade name "DIANAL MB-2660", manufactured by Mitsubishi Chemical Corporation; poly(methyl methacrylate); weight-average molecular weight (Mw): 65,000

<Image Recording>

Using the prepared ink, an article with a recorded image was obtained in the same manner as in Examples 1 to 22.

<Evaluation>

(Alcohol Resistance of Image (Using 75% by Mass Ethanol Aqueous Solution))

The obtained image was evaluated for alcohol resistance in the same manner as the evaluation of the alcohol resistance in Examples 1 to 22.

The results are shown in Table 4.

Table 4 also shows the results of Example 20 described above for comparison.

(Alcohol Resistance of Image (Using 95% by Mass Ethanol Aqueous Solution))

The obtained image was evaluated for alcohol resistance (using a 95% by mass ethanol aqueous solution) in the same manner as the evaluation of the alcohol resistance in Examples 1 to 22, except that the 75% by mass ethanol aqueous solution was changed to the 95% by mass ethanol aqueous solution.

Also, the evaluation of the alcohol resistance (using a 95% by mass ethanol aqueous solution) of the image was performed on Example 20 described above.

The results are shown in Table 4.

(Readability of Image)

In addition, using an infrared (IR) detector, it was determined whether or not the image in the obtained article with a recorded image had IR readability as a readable performance.

As a result, the image in the article with a recorded image of each of Examples A to E had IR readability.

TABLE 4

| | | | Example 20 | Example A | Example B | Example C | Example D | Example E |
|---|---|---|---|---|---|---|---|---|
| Near-infrared absorbing coloring agent (D) | Squarylium coloring agent | Compound S-3 | 1 | 1 | — | — | 1 | 1 |
| | | Compound S-1 | — | — | 1 | — | — | — |
| | | Compound S-7 | — | — | — | 1 | — | — |
| Pigment derivative | Copper phthalocyanine-based synergist | SOLSPERSE 12000S | 0.005 | 0.005 | 0.005 | 0.005 | 0.005 | 0.005 |
| Dispersant | Basic dispersant | SOLSPERSE 71000 | 1 | 1 | 1 | 1 | 1 | 1 |
| Siloxane compound (C) | Having 30% by mole or more of specific AO unit | TEGORAD 2200N | 1.0 | 1.0 | 1.0 | 1.0 | 1.0 | 1.0 |
| Polymerizable monomer (A) | Difunctional monomer | MPDDA | 24 | 24 | 24 | 24 | 24 | 24 |
| | Difunctional monomer | DPGDA | 25 | 25 | 25 | 25 | 25 | 25 |
| | Monofuctional monomer/viscosity adjustment/high Tg | IBOA | 14 | 14 | 14 | 14 | 14 | 14 |
| | Difunctional monomer | TCDDMDA | 13 | 13 | 13 | 13 | 13 | 13 |
| | Trifunctional monomer | EOTMPTA | 7 | 7 | 7 | 7 | 7 | 7 |
| | Monofuctional monomer | PEA | 1.8 | 0.9 | 0.9 | 0.9 | 0.9 | 0.9 |
| Polymerization initiator (B) | Acylphosphine-based initiator | Omnirad 819 | 4 | 4 | 4 | 4 | 4 | 4 |
| | | Omnirad TPO-L | 6 | 6 | 6 | 6 | 6 | 6 |
| Sensitizer | Thioxanthone-based sensitizer | Speedcure 7010 | 2 | 2 | 2 | 2 | 2 | 2 |
| Polymerization inhibitor | Nitrosamine-based polymerization inhibitor | UV-12 | 0.2 | 0.1 | 0.1 | 0.1 | 0.1 | 0.1 |
| Resin | Acrylic resin | DIANAL BR-113 (Mw: 30,000) | — | 1 | 1 | 1 | — | — |
| | | DIANAL BR-110 (Mw: 72,000) | — | — | — | — | 1 | — |
| | | DIANAL MB-2660 (Mw: 65,000) | — | — | — | — | — | 1 |
| | Total (part by mass) | | 100.0 | 100.0 | 100.0 | 100.0 | 100.0 | 100.0 |
| Detail of siloxane compound (C) | x (molar ratio of Si—O unit (with side chain)) | | 1.0 | 1.0 | 1.0 | 1.0 | 1.0 | 1.0 |
| | y (molar ratio of Si—O unit (without side chain)) | | 7.0 | 7.0 | 7.0 | 7.0 | 7.0 | 7.0 |
| | m (molar ratio of EO unit) | | 17.0 | 17.0 | 17.0 | 17.0 | 17.0 | 17.0 |
| | n (molar ratio of PO unit) | | 5.0 | 5.0 | 5.0 | 5.0 | 5.0 | 5.0 |

TABLE 4-continued

| | | Example 20 | Example A | Example B | Example C | Example D | Example E |
|---|---|---|---|---|---|---|---|
| | (m + n)/(x + y + m + n)*100 | 73.3 | 73.3 | 73.3 | 73.3 | 73.3 | 73.3 |
| | Mass ratio [polymerizable monomer (A)/ siloxane compound (C)] | 84.8 | 83.9 | 83.9 | 83.9 | 83.9 | 83.9 |
| | Proportion of polymerizable monomer (A) in entire ink [% by mass] | 84.8 | 84.7 | 84.7 | 84.7 | 84.7 | 84.7 |
| | Proportion of monofunctional monomer in entire polymerizable monomer (A) [% by mass] | 18.6 | 17.8 | 17.8 | 17.8 | 17.8 | 17.8 |
| | Content of acrylic resin with respect to entire polymerizable monomer (A) | 0 | 0.84 | 0.84 | 0.84 | 0.84 | 0.84 |
| | Proportion of component having molecular weight of 1000 or more in entire ink [% by mass] | 4.0 | 5.0 | 5.0 | 5.0 | 5.0 | 5.0 |
| SP value calculation of polymerizable monomer (A) | δd | 16.5 | 16.5 | 16.5 | 16.5 | 16.5 | 16.5 |
| | δp | 3.6 | 3.6 | 3.6 | 3.6 | 3.6 | 3.6 |
| | δh | 5.2 | 5.2 | 5.2 | 5.2 | 5.2 | 5.2 |
| | SP value | 17.7 | 17.7 | 17.7 | 17.7 | 17.7 | 17.7 |
| Evaluation result | Alcohol resistance (using 75% by mass ethanol aqueous solution) | AAA | AAA | AAA | AAA | AAA | AAA |
| | Alcohol resistance (using 95% by mass ethanol aqueous solution) | AA | AAA | AAA | AAA | AAA | AAA |

As shown in Table 4, in Examples A to E, the alcohol resistance of the recorded image was excellent as in Examples 1 to 22.

Further, by the comparison between Example 20 and Examples A to E, it was confirmed that the alcohol resistance was further improved in a case where the ink contained the acrylic resin (Examples A to E).

Examples F to I

Inks having compositions shown in Table 5 were prepared.

These inks were prepared in the same manner as the ink of Example 20, except that the type of the siloxane compound (C) was changed as described in Table 5.

Details of each component (including the type of the siloxane compound (C)) in the ink are as shown in the description of Examples 1 to 22.

<Image Recording>

Using the prepared ink, an article with a recorded image was obtained in the same manner as in Example 20.

<Evaluation>

(Alcohol Resistance of Image (Using 95% by Mass Ethanol Aqueous Solution))

The obtained image was evaluated for alcohol resistance (using a 95% by mass ethanol aqueous solution) in the same manner as the evaluation of the alcohol resistance in Examples 1 to 22, except that the 75% by mass ethanol aqueous solution was changed to the 95% by mass ethanol aqueous solution.

Also, the evaluation of the alcohol resistance (using a 95% by mass ethanol aqueous solution) of the image was performed on Example 20 described above.

The results are shown in Table 4.

(Readability of Image)

In addition, using an infrared (IR) detector, it was determined whether or not the image in the obtained article with a recorded image had IR readability as a readable performance.

As a result, the image in the article with a recorded image of each of Examples F to I had IR readability.

TABLE 5

| | | | Example 20 | Example F | Example G | Example H | Example I |
|---|---|---|---|---|---|---|---|
| Near-infrared absorbing coloring agent (D) | Squarylium coloring agent | Compound S-3 | 1 | 1 | 1 | 1 | 1 |
| Pigment derivative | Copper phthalocyanine-based synergist | SOLSPERSE 12000S | 0.005 | 0.005 | 0.005 | 0.005 | 0.005 |
| Dispersant | Basic dispersant | SOLSPERSE 71000 | 1 | 1 | 1 | 1 | 1 |
| Siloxane compound (C) | Having 30% by mole or more of specific AO unit | TEGORAD 2200N | 1.0 | — | — | — | — |
| | | BYKUV-3500 | — | 1.0 | — | — | — |
| | | TEGORAD 2250 | — | — | 1.0 | — | — |
| | | TEGORAD 2300 | — | — | — | 1.0 | — |
| | | TEGORAD 2010 | — | — | — | — | 1.0 |
| Polymerizable monomer (A) | Difunctional monomer | MPDDA | 24 | 24 | 24 | 24 | 24 |
| | Difunctional monomer | DPGDA | 25 | 25 | 25 | 25 | 25 |
| | Monofuctional monomer/viscosity | IBOA | 14 | 14 | 14 | 14 | 14 |

TABLE 5-continued

| | | | Example 20 | Example F | Example G | Example H | Example I |
|---|---|---|---|---|---|---|---|
| | adjustment/ high Tg | | | | | | |
| | Difunctional monomer | TCDDMDA | 13 | 13 | 13 | 13 | 13 |
| | Trifunctional monomer | EOTMPTA | 7 | 7 | 7 | 7 | 7 |
| | Monofuctional monomer | PEA | 1.8 | 1.8 | 1.8 | 1.8 | 1.8 |
| Polymerization initiator (B) | Acylphosphine-based initiator | Omnirad 819 | 4 | 4 | 4 | 4 | 4 |
| | | Omnirad TPO-L | 6 | 6 | 6 | 6 | 6 |
| Sensitizer | Thioxanthone-based sensitizer | Speedcure 7010 | 2 | 2 | 2 | 2 | 2 |
| Polymerization inhibitor | Nitrosamine-based polymerization inhibitor | UV-12 | 0.2 | 0.2 | 0.2 | 0.2 | 0.2 |
| | Total (part by mass) | | 100.0 | 100.0 | 100.0 | 100.0 | 100.0 |
| Detail of siloxane compound (C) | x (molar ratio of Si—O unit (with side chain)) | | 1.0 | 1.0 | 1.0 | 1.0 | 1.0 |
| | y (molar ratio of Si—O unit (without side chain)) | | 7.0 | 12.6 | 11.9 | 11.0 | 10.0 |
| | m (molar ratio of EO unit) | | 17.0 | 19.6 | 18.6 | 12.6 | 11.0 |
| | n (molar ratio of PO unit) | | 5.0 | 6.3 | 5.9 | 0.1 | 0.0 |
| | (m + n)/(x + y + m + n)*100 | | 73.3 | 65.6 | 65.5 | 51.5 | 50.0 |
| Mass ratio [polymerizable monomer (A)/ siloxane compound (C)] | | | 84.8 | 84.8 | 84.8 | 84.8 | 84.8 |
| Proportion of polymerizable monomer (A) in entire ink [% by mass] | | | 84.8 | 84.8 | 84.8 | 84.8 | 84.8 |
| Proportion of monofunctional monomer in entire polymerizable monomer (A) [% by mass] | | | 18.6 | 18.6 | 18.6 | 18.6 | 18.6 |
| Proportion of component having molecular weight of 1000 or more in entire ink [% by mass] | | | 4.0 | 4.0 | 4.0 | 4.0 | 4.0 |
| SP value calculation of polymerizable monomer (A) | δd | | 16.6 | 16.6 | 16.6 | 16.6 | 16.6 |
| | δp | | 3.4 | 3.4 | 3.4 | 3.4 | 3.4 |
| | δh | | 4.8 | 4.8 | 4.8 | 4.8 | 4.8 |
| | SP value | | 17.6 | 17.6 | 17.6 | 17.6 | 17.6 |
| Evaluation result | Alcohol resistance (using 95% by mass ethanol aqueous solution) | | AA | A | A | A | B |

From the results of Examples F and G and Example 20 shown in Table 5, it was found that, from the viewpoint of improving the alcohol resistance of the image, "(in +n)/(x+y+m+n)*100" (that is, the value A) was preferably 50% by mole or more and more preferably 51% by mole or more. As described above, the value A corresponds to the molar ratio [specific AO unit/(Si—O unit+specific AO unit)] described above.

The disclosure of JP2021-161313 filed on Sep. 30, 2021 and the disclosure of JP2022-132501 filed on Aug. 23, 2022 are incorporated in the present specification by reference.

All documents, patent applications, and technical standards described in the present specification are herein incorporated by reference to the same extent that each individual document, patent application, or technical standard was specifically and individually indicated to be incorporated by reference.

What is claimed is:

1. An ink jet recording ink comprising:

a polymerizable monomer (A);

a polymerization initiator (B);

a siloxane compound (C) which includes a main chain including a structural unit having an Si—O bond and a side chain including at least one of an ethyleneoxy unit or a propyleneoxy unit and a polymerizable group, in which a proportion of a total number of moles of the ethyleneoxy unit and the propyleneoxy unit with respect to a total number of moles of the structural unit having an Si—O bond, the ethyleneoxy unit, and the propyleneoxy unit is 30% by mole or more; and a near-infrared absorbing coloring agent (D)

wherein the near-infrared absorbing coloring agent (D) includes a squarylium coloring agent represented by Formula 1, (1)

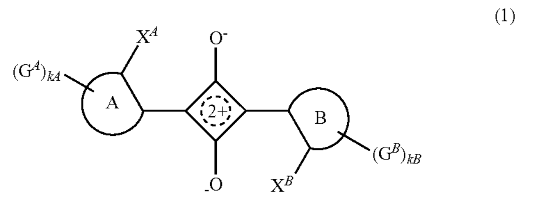

in Formula 1, a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to $n_A$, kB represents an integer of 0 to $n_B$, $n_A$ represents an integer which is a maximum number of $G^A$'s substitutable for the ring A, $n_B$ represents an integer which is a maximum number of $G^B$'s substitutable for the ring B, $X^A$ and $G^A$ may be bonded to each other to form a ring, $X^B$ and $G^B$ may be bonded to each other to form a ring, in a case of a plurality of $G^A$'s, $G^A$'s may be bonded to each other to form a ring structure, and in a case of a plurality of $G^B$'s, $G^B$'s may be bonded to each other to form a ring structure, and wherein a proportion of a monofunctional polymerizable monomer in the polymerizable monomer (A) is 50% by mass or less.

2. The ink jet recording ink according to claim 1, wherein an SP value of the polymerizable monomer (A) is 18.0 $MPa^{1/2}$ or less.

3. The ink jet recording ink according to claim 1, wherein a content of the siloxane compound (C) is 0.5% by mass to 3.0% by mass with respect to a total amount of the ink jet recording ink.

4. The ink jet recording ink according to claim 1, wherein a mass ratio of a content of the polymerizable monomer (A) to a content of the siloxane compound (C) is 26.0 to 300.

5. The ink jet recording ink according to claim 1, wherein the proportion of the monofunctional polymerizable monomer in the polymerizable monomer (A) is 40% by mass or less.

6. The ink jet recording ink according to claim 1, wherein the siloxane compound (C) includes a siloxane compound (CA) represented by Formula CA, (CA)

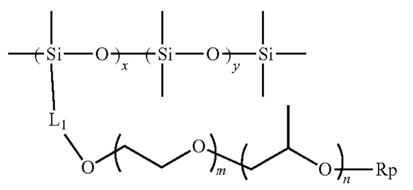

in Formula CA,

Rp represents a polymerizable group, $L_1$ represents a divalent linking group, x represents an integer of 1 or more, y represents an integer of 0 or more, m and n each independently represent an integer of 0 or more, and a sum of m and n is an integer of 1 or more, where, in Formula CA, a value A calculated by a mathematical expression "((m+n)/(x+y+m+n))×100" is 30 or more, in Formula CA, a sequence of a structural unit with a subscript x and a structural unit with a subscript y may be a sequence of block copolymerization or a sequence of random copolymerization, and in Formula CA, a sequence of a structural unit with a subscript m and a structural unit with a subscript n may be a sequence of block copolymerization or a sequence of random copolymerization.

7. The ink jet recording ink according to claim 1, further comprising:

a pigment derivative.

8. The ink jet recording ink according to claim 1, further comprising:

an acrylic resin.

9. An ink jet recording method using the ink jet recording ink according to claim 1, the ink jet recording method comprising:

a step of jetting the ink jet recording ink onto a substrate by an ink jet recording system; and a step of irradiating the ink jet recording ink jetted onto the substrate with an active energy ray.

* * * * *